United States Patent
Salonen

(10) Patent No.: US 9,578,022 B2
(45) Date of Patent: Feb. 21, 2017

(54) MULTI-FACTOR AUTHENTICATION TECHNIQUES

(71) Applicants: BOOKIT OY AJANVARAUSPALVELU, Helsinki (FI); Jukka Salonen, Luhtajoki (FI)

(72) Inventor: Jukka Salonen, Luhtajoki (FI)

(73) Assignee: Bookit Oy Ajanvarauspalvelu, Helsinki (FI)

( * ) Notice: Subject to any disclaimer, the term of this patent is extended or adjusted under 35 U.S.C. 154(b) by 0 days.

(21) Appl. No.: 13/800,641

(22) Filed: Mar. 13, 2013

(65) Prior Publication Data

US 2014/0282958 A1 Sep. 18, 2014
US 2016/0057137 A9 Feb. 25, 2016

Related U.S. Application Data

(63) Continuation-in-part of application No. 13/529,776, filed on Jun. 21, 2012, now Pat. No. 8,737,959, and a continuation-in-part of application No. 13/529,737, filed on Jun. 21, 2012, now Pat. No. 8,737,955, and a (Continued)

(30) Foreign Application Priority Data

| Aug. 21, 2001 | (FI) | .................................... | 20011680 |
| Dec. 2, 2005 | (FI) | .................................... | 20051245 |
| May 20, 2006 | (FI) | .................................... | 20060419 |
| May 20, 2006 | (FI) | .................................... | 20060420 |
| Jul. 4, 2008 | (FI) | .................................... | 20085701 |

(51) Int. Cl.
*H04L 29/06* (2006.01)

(52) U.S. Cl.
CPC ..... *H04L 63/0861* (2013.01); *H04L 2463/082* (2013.01)

(58) Field of Classification Search
CPC ........ G06F 21/32; G06F 21/31; G06F 21/34; G06F 21/40; G06F 21/335; G06F 21/60; G06F 21/6245; G06F 21/33; G06F 21/57; G06F 21/602; G06F 21/604; G06F 21/606; G06F 21/73; G06F 21/77; G06F 11/3466; G06F 17/30289; G06F 2221/2137; G06F 2221/2141; G06F 2221/2153; G06F 3/013; G06F 9/45545; H04L 2209/56; H04L 2209/80; H04L 63/08; H04L 63/0853; H04L 63/0861; H04L 63/0815; H04L 63/105; H04L 63/18; H04L 63/0442; H04L 63/083; H04L 63/107; H04L 63/1466; H04L 63/20
See application file for complete search history.

(56) References Cited

U.S. PATENT DOCUMENTS

| 5,592,666 A | 1/1997 | Perez |
| 5,838,965 A | 11/1998 | Kavanagh et al. |

(Continued)

FOREIGN PATENT DOCUMENTS

| CN | 1675637 A | 9/2005 |
| EP | 0 881 802 A1 | 2/1998 |

(Continued)

OTHER PUBLICATIONS

Bmd wireless AG, Wireless Application messaging server, 2004.

(Continued)

*Primary Examiner* — Eric W Shepperd
(74) *Attorney, Agent, or Firm* — Barnes & Thornburg LLP

(57) ABSTRACT

An authentication technique with a teaching phase and authentication phase. In the teaching phase, authentication information is collected for a user in at least two categories, wherein one category relates to measurable physical characteristics of the user, another category relates to communication resources available to the user; and a third category relates to knowledge possessed by the user. In the authentication phase, some of the collected authentication information is used to formulate challenge(s) for presentation to the user. Response(s) to the formulated challenge(s) is/are received from the user and correctness of the received response is determined based at least partially on comparison with at least a portion of the collected authentication information. A correctness metric is calculated for the response(s). The user is authenticated if the correctness metric meets or exceeds a first threshold value.

35 Claims, 8 Drawing Sheets

Related U.S. Application Data continuation-in-part of application No. 13/452,311, filed on Apr. 20, 2012, now Pat. No. 8,737,954, and a continuation-in-part of application No. 13/452,229, filed on Apr. 20, 2012, now Pat. No. 8,737,958, and a continuation-in-part of application No. 13/332,409, filed on Dec. 21, 2011, and a continuation-in-part of application No. 13/074,037, filed on Mar. 29, 2011, which is a continuation-in-part of application No. 10/734,352, filed on Dec. 11, 2003, now Pat. No. 9,313,161, which is a continuation of application No. 10/227,194, filed on Aug. 21, 2002, now Pat. No. 7,406,429, application No. 13/800,641, which is a continuation-in-part of application No. 13/039,338, filed on Mar. 3, 2011, now Pat. No. 8,634,522, which is a continuation of application No. 11/885,748, filed as application No. PCT/FI2006/050517 on Nov. 27, 2006, now Pat. No. 7,912,190, application No. 13/800,641, which is a continuation-in-part of application No. 13/002,512, filed as application No. PCT/FI2009/050611 on Jul. 3, 2009, now Pat. No. 8,825,774, application No. 13/800,641, which is a continuation-in-part of application No. 12/972,610, filed on Dec. 20, 2010, now Pat. No. 9,177,268, which is a continuation of application No. 11/980,470, filed on Oct. 31, 2007, now Pat. No. 8,050,664, which is a continuation of application No. 10/227,194, filed on Aug. 21, 2002, now Pat. No. 7,406,429, application No. 13/800,641, which is a continuation-in-part of application No. 12/958,870, filed on Dec. 2, 2010, which is a continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429, application No. 13/800,641, which is a continuation-in-part of application No. 12/944,749, filed on Nov. 12, 2010, now Pat. No. 8,666,380, which is a continuation-in-part of application No. 11/980,470, filed on Oct. 31, 2007, now Pat. No. 8,050,664, which is a continuation of application No. 10/227,194, filed on Aug. 21, 2002, now Pat. No. 7,406,429, application No. 13/800,641, which is a continuation-in-part of application No. 12/401,392, filed on Mar. 10, 2009, and a continuation-in-part of application No. 13/452,229, filed on Apr. 20, 2012, now Pat. No. 8,737,958, which is a continuation-in-part of application No. 12/226,878, filed as application No. PCT/FI2007/050229 on Apr. 26, 2007, now Pat. No. 8,254,531, application No. 13/800,641, which is a continuation-in-part of application No. 13/452,229, filed on Apr. 20, 2012, now Pat. No. 8,737,958, which is a continuation-in-part of application No. 12/226,876, filed as application No. PCT/FI2007/050230 on Apr. 26, 2007, now Pat. No. 8,260,330.

(60) Provisional application No. 61/318,648, filed on Mar. 29, 2010.

(56) References Cited

U.S. PATENT DOCUMENTS

| | | | |
|---|---|---|---|
| 5,940,818 A | 8/1999 | Malloy et al. | |
| 5,987,467 A | 11/1999 | Ross et al. | |
| 6,003,036 A | 12/1999 | Martin | |
| 6,085,100 A | 7/2000 | Tarnanen | |
| 6,104,870 A | 8/2000 | Frick et al. | |
| 6,199,076 B1 | 3/2001 | Logan et al. | |
| 6,232,955 B1* | 5/2001 | Guttag | G09G 5/06 345/601 |
| 6,539,360 B1 | 3/2003 | Kadaba | |
| 6,560,456 B1 | 5/2003 | Lohtia et al. | |
| 6,564,261 B1 | 5/2003 | Gudjonsson et al. | |
| 6,625,461 B1 | 9/2003 | Bertacchi | |
| 6,639,919 B2 | 10/2003 | Kroninger et al. | |
| 6,772,336 B1* | 8/2004 | Dixon, Jr. | G06F 21/31 713/165 |
| 6,990,332 B2 | 1/2006 | Vihinen | |
| 7,149,537 B1 | 12/2006 | Kupsh et al. | |
| 7,154,060 B2 | 12/2006 | Rosenbaum et al. | |
| 7,222,081 B1 | 5/2007 | Sone | |
| 7,406,429 B2 | 7/2008 | Salonen | |
| 7,447,784 B2* | 11/2008 | Eun | G06F 21/313 709/220 |
| 7,451,118 B2 | 11/2008 | McMeen et al. | |
| 7,610,208 B2 | 10/2009 | Salonen | |
| 7,610,224 B2 | 10/2009 | Spiegel | |
| 7,619,584 B2 | 11/2009 | Wolf | |
| 7,660,397 B2 | 2/2010 | Heen et al. | |
| 8,050,664 B2 | 11/2011 | Salonen | |
| 2001/0037264 A1 | 11/2001 | Husemann et al. | |
| 2001/0039616 A1* | 11/2001 | Kumagai | H04L 63/0838 713/169 |
| 2001/0049785 A1* | 12/2001 | Kawan | G06Q 20/3674 713/156 |
| 2002/0028686 A1 | 3/2002 | Kagi | |
| 2002/0032589 A1 | 3/2002 | Shah | |
| 2002/0034301 A1* | 3/2002 | Andersson | G06F 21/31 380/270 |
| 2002/0059146 A1 | 5/2002 | Keech | |
| 2002/0059342 A1* | 5/2002 | Gupta | G06F 17/241 715/233 |
| 2002/0080822 A1 | 6/2002 | Brown et al. | |
| 2002/0104007 A1 | 8/2002 | Moodie et al. | |
| 2002/0111914 A1 | 8/2002 | Terada et al. | |
| 2002/0165000 A1 | 11/2002 | Fok | |
| 2002/0173319 A1 | 11/2002 | Fostick | |
| 2002/0180696 A1* | 12/2002 | Maritzen et al. | 345/156 |
| 2002/0184509 A1* | 12/2002 | Scheidt | G06F 21/31 713/185 |
| 2002/0188562 A1 | 12/2002 | Igarashi et al. | |
| 2002/0191795 A1 | 12/2002 | Wills | |
| 2003/0005126 A1 | 1/2003 | Schwartz et al. | |
| 2003/0101071 A1 | 5/2003 | Salonen | |
| 2003/0163536 A1 | 8/2003 | Pettine, Jr. | |
| 2003/0211844 A1 | 11/2003 | Omori | |
| 2004/0128158 A1 | 7/2004 | Salonen | |
| 2004/0128173 A1 | 7/2004 | Salonen | |
| 2004/0139318 A1 | 7/2004 | Chen et al. | |
| 2004/0157628 A1 | 8/2004 | Daniel et al. | |
| 2004/0185883 A1 | 9/2004 | Rukman | |
| 2004/0198322 A1 | 10/2004 | Mercer | |
| 2005/0027608 A1 | 2/2005 | Wiesmuller et al. | |
| 2005/0054286 A1 | 3/2005 | Kanjilal et al. | |
| 2005/0065995 A1 | 3/2005 | Milstein et al. | |
| 2005/0102230 A1 | 5/2005 | Haidar | |
| 2005/0171738 A1 | 8/2005 | Kadaba | |
| 2005/0246209 A1 | 11/2005 | Salonen | |
| 2005/0268107 A1 | 12/2005 | Harris et al. | |
| 2006/0010085 A1 | 1/2006 | McMeen et al. | |
| 2006/0040682 A1 | 2/2006 | Goertz et al. | |
| 2006/0075139 A1 | 4/2006 | Jungek | |
| 2006/0131385 A1 | 6/2006 | Kim | |
| 2006/0224407 A1 | 10/2006 | Mills | |
| 2006/0271551 A1 | 11/2006 | Suojasto | |
| 2007/0010266 A1 | 1/2007 | Chaudhuri | |
| 2007/0047533 A1 | 3/2007 | Criddle et al. | |
| 2007/0135101 A1 | 6/2007 | Ramati et al. | |
| 2007/0143230 A1 | 6/2007 | Narainsamy et al. | |
| 2007/0250920 A1 | 10/2007 | Lindsay | |
| 2008/0147408 A1 | 6/2008 | Da Palma et al. | |
| 2008/0317224 A1 | 12/2008 | Salonen | |
| 2009/0116703 A1 | 5/2009 | Schultz | |
| 2009/0281929 A1 | 11/2009 | Boitet et al. | |
| 2011/0302645 A1 | 12/2011 | Headley | |

(56) References Cited

U.S. PATENT DOCUMENTS

| | | |
|---|---|---|
| 2012/0060030 A1 | 3/2012 | Lamb |
| 2012/0215695 A1 | 8/2012 | Salonen |
| 2012/0310743 A1 | 12/2012 | Johri |
| 2013/0036462 A1 | 2/2013 | Krishnamurthi |

FOREIGN PATENT DOCUMENTS

| | | |
|---|---|---|
| EP | 0 967 754 A2 | 12/1999 |
| EP | 1 065 899 A1 | 1/2001 |
| EP | 1 458 201 A1 | 9/2004 |
| EP | 2053531 A1 | 4/2009 |
| EP | 1 546 938 B1 | 9/2010 |
| FI | 20011680 | 2/2003 |
| FI | 117663 B1 | 12/2006 |
| FI | 20060387 | 10/2007 |
| FI | 118586 B | 12/2007 |
| GB | 2391646 A | 11/2004 |
| GB | 2435565 A | 8/2007 |
| GB | 2457491 A | 8/2009 |
| KR | 20040013261 A | 2/2004 |
| WO | 02067602 A1 | 8/2002 |
| WO | 2004019223 A1 | 3/2004 |
| WO | 2006122399 A1 | 11/2006 |
| WO | 2007122292 A1 | 1/2007 |
| WO | 2007063179 A1 | 6/2007 |
| WO | 2007125171 A1 | 11/2007 |
| WO | 2008017695 A1 | 7/2008 |
| WO | 2010000949 A1 | 1/2010 |

OTHER PUBLICATIONS

Content Gateway, Version 4.0 Development and Billing Manual, Version 1.0, Jan. 1, 2005, TeliaSonera Finland OY, www.sonera.fifilessonera.fi.

Elisa Plc's Press Release Nov. 22, 2004, "Innovative Solution receives 2004 European Good Practice Award in Oppupaational Health and Safety" and the appendix: "BookIT case. pdf".

Elisa Plc's Press Release Sep. 6, 2004, "Bookit Ltd and Elisa Implement a Handy Mobile Phone-enabled Check-in Service for Finnair" www.elisa.fi.

Enpower Interactive Group Ltd, Virtual Mobile Redirector—Product Information Document, 2001.

Finnair Plc's Press Release Sep. 6, 2004, "Finnair to Introduce the World's Easiest Check-in—with a text message", www.bookit.netnews.

Finnish Search Report Apr. 5, 2006.

Finnish Search Report Mar. 6, 2009.

Jyrki Penttinen, GSM-tekniikka, WSOY, Porvoo 1999, pp. 155-157, 222 & 331-332.

Kauppalehti, Mobiilipalvelujen oltava yksinkertaisia: BookIT: n Jukka Salonen uskoo tavallisiin tekstiviesteihin, Heikki Nenonen, p. 19, published Sep. 6, 2005.

Mouly et al, The GSM System for Mobile Communications, Palaiseau 1992, pp. 556-560.

Verkkouutiset Feb. 21, 2001, "Seonera tarjoaa matkaviestinoperaattoreille Content Gateway—palvelualustaa", www.verkkouutiset.fi.

Mobileway, "Mobileway launches is Mobile Transaction Tracker solution—an interactive platform to authenticate macropayment made by mobile consumer," http://www.mobileway.com/pages/newsevents/pressrelease, Mobileway, 2002, pp. 1-2.

O'Gorman, "Comparing Passwords, Tokens, and Biometrics for User Authentication", Proceedings of the IEEE, vol. 91, No. 12, pp. 2021-2040, (Dec. 2003).

International Search Report and Written Opinion of the International Searching Authority for PCT/IF2014/050184 filed Mar. 13, 2014.

* cited by examiner

MULTI-FACTOR AUTHENTICATION TECHNIQUES

PARENT CASE INFORMATION

The present invention claims benefit from the following commonly owned earlier applications: 1) Ser. No. 12/944,749, titled "Communication Method and System", filed Nov. 12, 2010, claiming priority from Fl 20011680, filed Aug. 21, 2001; 2) Ser. No. 13/002,512, titled "Method and System for Sending Messages", filed Jul. 3, 2009, claiming priority from Fl 20085701, filed Jul. 4, 2008; 3) Ser. No. 13/074,037, titled "Authentication Method and System", filed Mar. 29, 2011, claiming priority from Fl 20011680, filed Aug. 21, 2001; 4) Ser. No. 13/039,338, titled "Method and System for the Mass Sending of Messages", filed Mar. 3, 2011, claiming priority from Fl 20051245, filed Dec. 2, 2005; 5) Ser. No. 12/972,610, titled "Booking Method and System", filed Dec. 20, 2010, claiming priority from Fl 20011680, filed Aug. 21, 2001; 6) Ser. No. 12/958,870, titled "Communication Method and System", filed Dec. 2, 2010, claiming priority from Fl 20011680, filed Aug. 21, 2001; 7) Ser. No. 12/401,392, titled "Method and System for Delivery of Goods", filed Mar. 10, 2009; 8) Ser. No. 12/226,878, titled "Method and System for Combining Text and Voice Messages in a Communications Dialogue", filed Apr. 26, 2007, claiming priority from Fl 20060419, filed May 2, 2006; 9) Ser. No. 12/226,876, titled "Method and System for Combining Text and Voice Messages in a Communications Dialogue", filed Apr. 26, 2007, claiming priority from Fl 20060420, filed May 2, 2006; 10) Ser. No. 13/332,409, titled "Financial Fraud Prevention Method and System", filed 21 Dec. 2011; 11) Ser. No. 13/452,229, titled "Registration of recurring payment", filed Apr. 20, 2012; 12) Ser. No. 13/452,311, titled "One recurring payment invoking another", filed Apr. 20, 2012; 13) Ser. No. 13/529,776, titled "Registration of recurring payment", filed Jun. 21, 2012; and 14) Ser. No. 13/529,737, titled ""One recurring payment invoking another", filed Jun. 21, 2012. The contents of the above-identified parent applications are incorporated herein by reference. This means that features of the referenced parent applications can be employed in connection with the present disclosure, but to the extent that the parent applications define "the invention", it shall mean the invention disclosed in the respective reference documents.

FIELD

The present invention relates to authentication in a telecommunications system. Authentication can be performed to verify a user's identity and, optionally, other parameters, such as location.

BACKGROUND

A number of authentication schemes have been developed to authenticate users of data processing devices or communications terminals. A well-known authentication scheme involves a teaching phase in which setting up a new user account comprises teaching a username (login name) and password to an authentication element. A subsequent authentication phase comprises requesting the user to enter the username-password combination. If the entered username-password combination matches a pre-stored (taught) combination, the user is positively authenticated.

Such simple systems are vulnerable to intrusion and fraudulent behavior. Intruders can tap into the authentication system in several ways. They can cause installation of malware software in the users' computers. The malware software records keyboard entries by the user during login and relays the keyboard entries to the intruders. Another technique is to eavesdrop communication channels between an authentication server and the users' terminals. A third technique is to hack into the authentication server.

Attempts have been made to alleviate the security problems relating to current authentication schemes. Many improved authentication schemes are based on a paradigm known as "what you know and what you have". The username-password combination is an example of "what you know", while a mobile network identity is an example of "what you have". For instance, the teaching phase of authentication may involve teaching a mobile identity, such as an MSISDN number, to the authentication system. In the authentication phase the authentication server may generate a pseudo-random code and send it to the user's mobile terminal and request the user to return the pseudo-random code from another terminal, such as a computer, within a relatively short period of time. Because modern mobile communication systems use a PIN-code-based authentication, possession of a mobile terminal coupled with the mobile identity taught to the authentication system is an additional measure of security relating to the user being authenticated. Reference documents #1 and #2, which are a commonly-owned PCT application and US patent application, respectively, disclose various techniques for authentication. In particular, Reference document #1 discloses a technique called Dynamic Dialog Matrix (DDM), in which a mediator (proxy server) varies a sender number assigned to Short Message Service (SMS) messages and assigns a different sender number to each SMS message of a sequence. When clients (mobile users) respond to the SMS messages of the sequence, each reply message has a unique combination of sender address (the mobile terminal numbers) and recipient address (the address the mediator as sender address assigned to the query message). The unique combination of sender address and recipient address act as row and column addresses to data structure (called the DDM), and the cell identified by the two addresses contains the reply. With the DDM, the mediator knows not only which reply belongs to which query, but the mediator also knows, with a reasonable certainty, that the mobile user sending a reply message is the person to whom the query message was sent. Nobody else knows which sender address has been assigned to a query of interest. Accordingly, nobody else knows which recipient address a reply message should be sent.

In Reference document #2, FIGS. 9A, 9B and 9B of and their associated descriptions disclose techniques in which a combination of a general-purpose computer and a mobile terminal is used for authentication (and for additional functions, some of which may not be relevant for the present invention). FIG. 10 of Reference document #2 and its associated description disclose a system architecture which can be used to implement the present invention. The contents of said reference documents are incorporated herein by reference.

In spite of improvements of known authentication schemes, some residual problems remain. For instance, most authentication schemes are unnecessarily rigid, which means that the same level of security is required regardless of the value of a transaction or the user's prior history or other related factors. Another problem is that the combination of username, password and mobile identity can all be stolen from a legitimate user.

Accordingly, there is still need for improvements to authentication techniques, with respect to flexibility, security or both.

SUMMARY

An aspect of the present invention is a data processing system comprising: a memory system that stores program code instructions and data, and a processing system including at least one processing unit, wherein the processing system executes at least a portion of the program code instructions and processes the data. The memory system includes at least one authentication element executable by the processing system. The at least one authentication element instructs the processing system to perform at least one teaching phase with respect to at least one user, wherein, in the at least one teaching phase, authentication information is collected for the user in at least two of the following at least three categories: a first category on measurable physical characteristics of the user; a second category on communication resources available to the user; and a third category on knowledge possessed by the user.

The at least one authentication element further instructs the processing system to perform at least one authentication phase with respect to the at least one user. In the at least one authentication phase, at least a portion of the collected authentication information is used to formulate at least one challenge for presentation to the user. At least one response to the formulated challenge is received from the user and correctness of the received response is determined based at least partially on comparison with at least a portion of the collected authentication information. At least one correctness metric is calculated for the at least one response received from the user; and the user is authenticated if the at least one calculated correctness metric meets or exceeds a first threshold value.

In a typical use case the user is an authentication subject whose identity is to be authenticated by the data processing system. Optionally, the at least one authentication element is implemented on a server accessible to multiple users. Alternatively or additionally, the at least one authentication element is implemented on at least one communications terminal associated with the user to be authenticated. Implementing the authentication element at least partially on the communications terminal associated with the user has the benefit that the authentication element has access to the user interface and sensors of the communications terminal. In one illustrative but non-restrictive example, the authentication element implemented on the communications terminal may request the user to point at their nose with a designated finger of their left or right hand, after which the authentication element captures a photograph of the user performing the requested gesture, and then compares the photographs with photographs pre-stored in the teaching phase, or sends the captured photograph to an external authentication element (eg server) for comparison with pre-stored photographs. For added security the designated finger and hand may be varied randomly. As used in the present disclosure, "random(ly)" means varying an authentication challenge in a manner which the authentication subject can only guess at but not know with certainty. In other words, variation of an authentication challenge is random if the sequence of variation is not known to the authentication subject. Those skilled in the art will understand that if the authentication element is implemented partially, as a client component, on the communication terminal accessible to a user (authentication subject), the client component must be cryptographically secured and provided with a digital certificate.

The user is typically associated with a communications terminal having at least one network address.

In order to provide improved flexibility, the first threshold value for the calculated correctness metrics may be based on a value and/or nature of a transaction for which the user's identity is to be authenticated. For instance, the authentication element may require a higher threshold value for the calculated correctness metrics for high-valued transactions than for low-valued ones. Even in cases where a precise value cannot be determined, it is beneficial to implement an authentication scheme in which access to certain kinds or information (eg patient information in hospitals) requires a high threshold value for the correctness metrics, even if access to such information has no monetary value attached to it. Alternatively or additionally, the first threshold value for the calculated correctness metrics may be based on a prior history of the user.

In order to provide a very high security the at least one authentication element instructs the processing system to collect authentication information for the user in at least three categories in the at least one teaching phase. In the authentication phase(s) the processing system uses the collected authentication information of said at least three categories. Such a very high security may not be necessary for all transactions, and the authentication element may instruct the processing system to collect and use the authentication information in at least three categories if a value and/or nature of a transaction meets a set of predetermined criteria.

In cases where information in fewer than three categories is used, the teaching phase may involve collecting authentication information in a higher number of categories than are used in the authentication phase. In other words, one or two categories of authentication information may not be used in the authentication phase if the value and/or nature of the transaction permits this. In some implementations the authentication element instructs the processing system to randomly select at least one category and/or authentication information within a category to be used in the at least authentication phase. Again, in practice, "randomly" includes "pseudo-randomly", that is, a variation in the information and/or category being used for authentication in such a manner that the authentication subject can only guess what piece of authentication information or category will be used in the next authentication phase.

In some implementations the authentication information in the first category on measurable physical characteristics of the user (ie, "what you are") comprises at least one of biometric information and voice characteristics. This is a non-exhaustive list of physical characteristics of a user measurable by a modern smartphone. For instance, biometric information from the user's face, iris and/or at least one fingerprint can be captured with the smartphone's camera. Alternatively or additionally, a voice sample of the user may be captured by the smartphone's microphone.

For additional security, the authentication element(s) may be configured to collect multiple alternative data sets ("versions") of biometric information of the image data, of which a face, iris, fingerprint photos are representative examples. The authentication element then randomly selects at least one of the multiple data sets. For instance, the authentication element may instruct the user to touch their nose with the left forefinger, or their chin with the right fist, and then challenge the user to respond with captured image data that corresponds to the selected one data set. In other words, a randomly selected "version" of a gesture performed by the user and captured with the camera should match a photo of the same gesture that was previously stored in the teaching phase.

An illustrative but non-exhaustive list of examples of authentication information in the second category ("what you have") comprises at least one of: at least one cellular network address; multiple different communication channels using the at least one cellular network address; at least one e-mail address; and at least one social network address. To provide additional authentication security, the authentication information in the second category may comprise multiple data sets, and the authentication element may be configured to randomly select at least one of the multiple data sets. For instance, the authentication element may instruct the user or their communications terminal to send a response to a random network address/link. Alternatively or additionally, the authentication element may instruct the user or their communications terminal to send authentication information over a randomly selected network resource, which could be a MAC address, an ISDN number, etc.

An illustrative but non-exhaustive list of examples of authentication information in the third category ("what you know") comprises at least one of: username/password/PIN code; factual questions/answers; user's location (eg indicated by the terminal); timing information.

Combinations of username, password and/or PIN code are well known in the context of simpler authentication schemes, and they can be used in the third category of authentication information of the present disclosure as examples of "what you know". Combinations of factual questions and answers, like "your mother's maiden name" are also well known. A feature shared by usernames, passwords, PIN codes and answers to factual questions is that they are entered via the terminal's keyboard or keypad (which may be implemented by means of a touch-sensitive display). It is worth noting that modern smartphones typically comprise sensors which can also be used to collect authentication information in the third category. For instance, the user may be instructed to tap a rhythm of their favorite piece of music. The rhythm may be collected by means of the smartphone's microphone. Alternatively, if the smartphone has a gyro (multidimensional inclination or acceleration sensor), the user may tap or swing the smartphone in the air, and the rhythm is captured by the inclination or acceleration sensor. A legitimate user who knows what the piece is can tap the rhythm but eavesdroppers have a hard time guessing the piece from the rhythm alone, or even remembering that rhythm. A simpler version of this comprises instructing the user to tap a few beats with intervals known only the legitimate user. Alternatively or additionally, the inclination or acceleration sensor may be utilized in such a manner that the user is instructed to draw a gesture or write a word in the air. The drawing or writing is captured by the inclination or acceleration sensor and compared against a pre-stored version captured in the teaching phase.

Again, additional security may be provided if the authentication information in the third category ("what you know") comprises multiple data sets and the element is configured to randomly select at least one of the multiple data sets. For instance, the authentication element may ask a randomly selected question, instruct the user to perform a randomly selected act, which is captured with the sensors of the smartphone and compared with a version pre-stored in the teaching phase, and so on.

In some implementations, the authentication element(s) is/are configured to consider the authentication of the user's identity valid for only a specific place and/or time. For instance, a maintenance worker may be granted access to specific premises at a certain time.

BRIEF DESCRIPTION OF DRAWINGS

Referring now to FIG. 2A, an exemplary use case involving an initial transaction to an individual service provider will be described next;

DETAILED DESCRIPTION OF SPECIFIC EMBODIMENTS

1. Typical Scenarios in which Authentication can be Utilized

Figure 1:
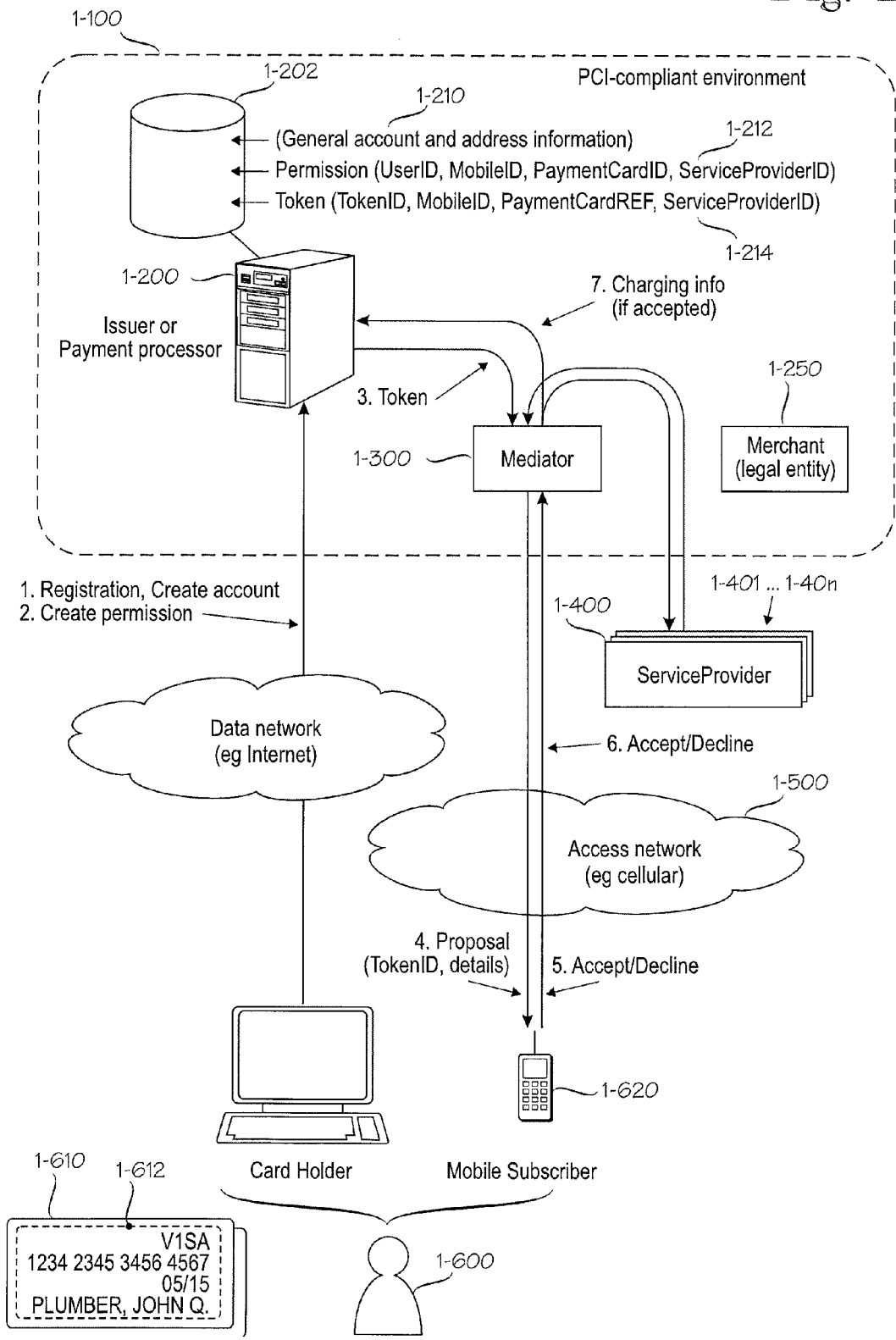
FIG. 1 is a block diagram of an embodiment of the invention, which can be used to authorize mobile payments.
Figure 2A:
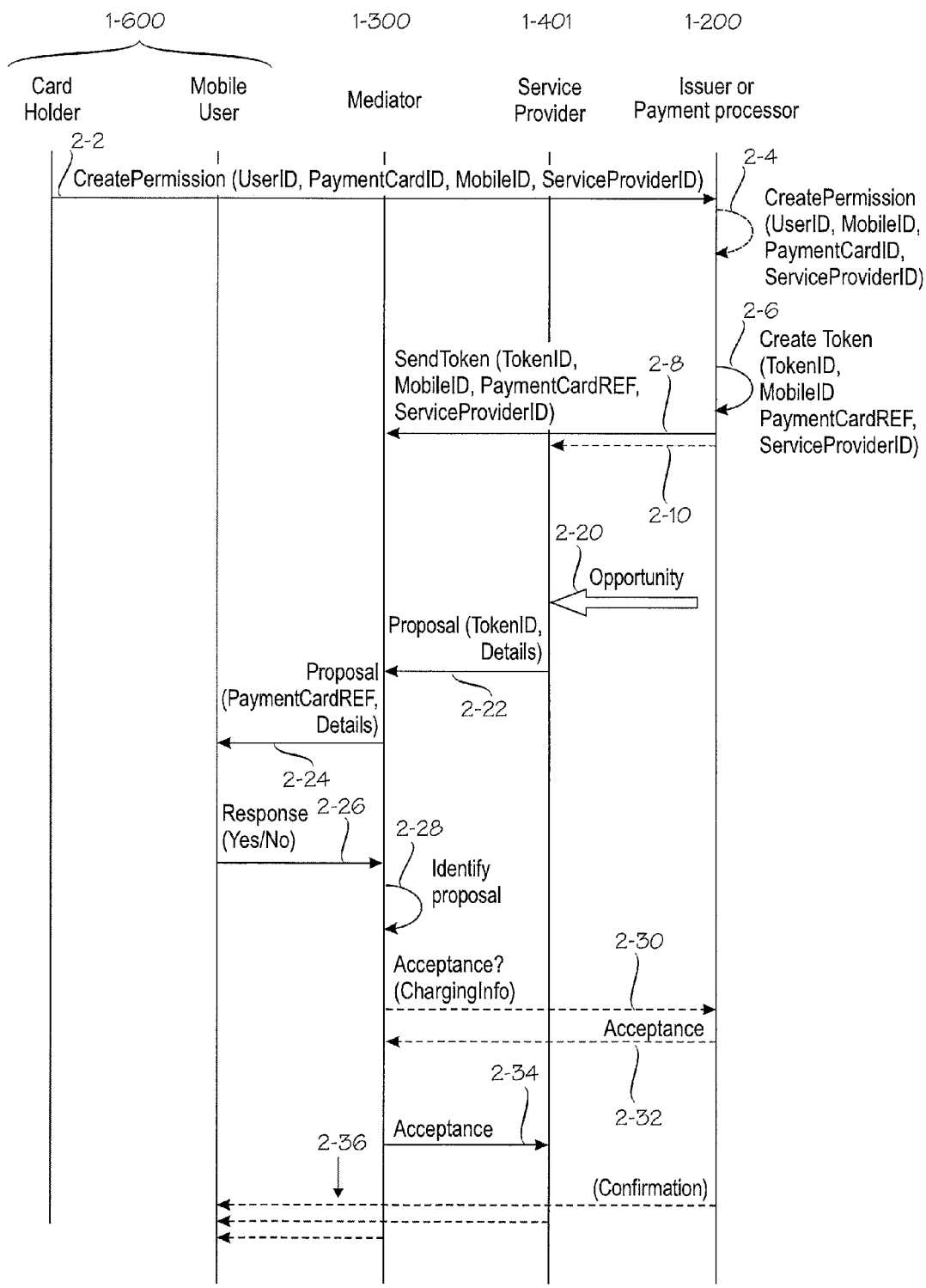
FIGS. 2A and 2B are signaling diagram illustrating exemplary series of events in the system shown in FIG. 1.
Figure 2B:
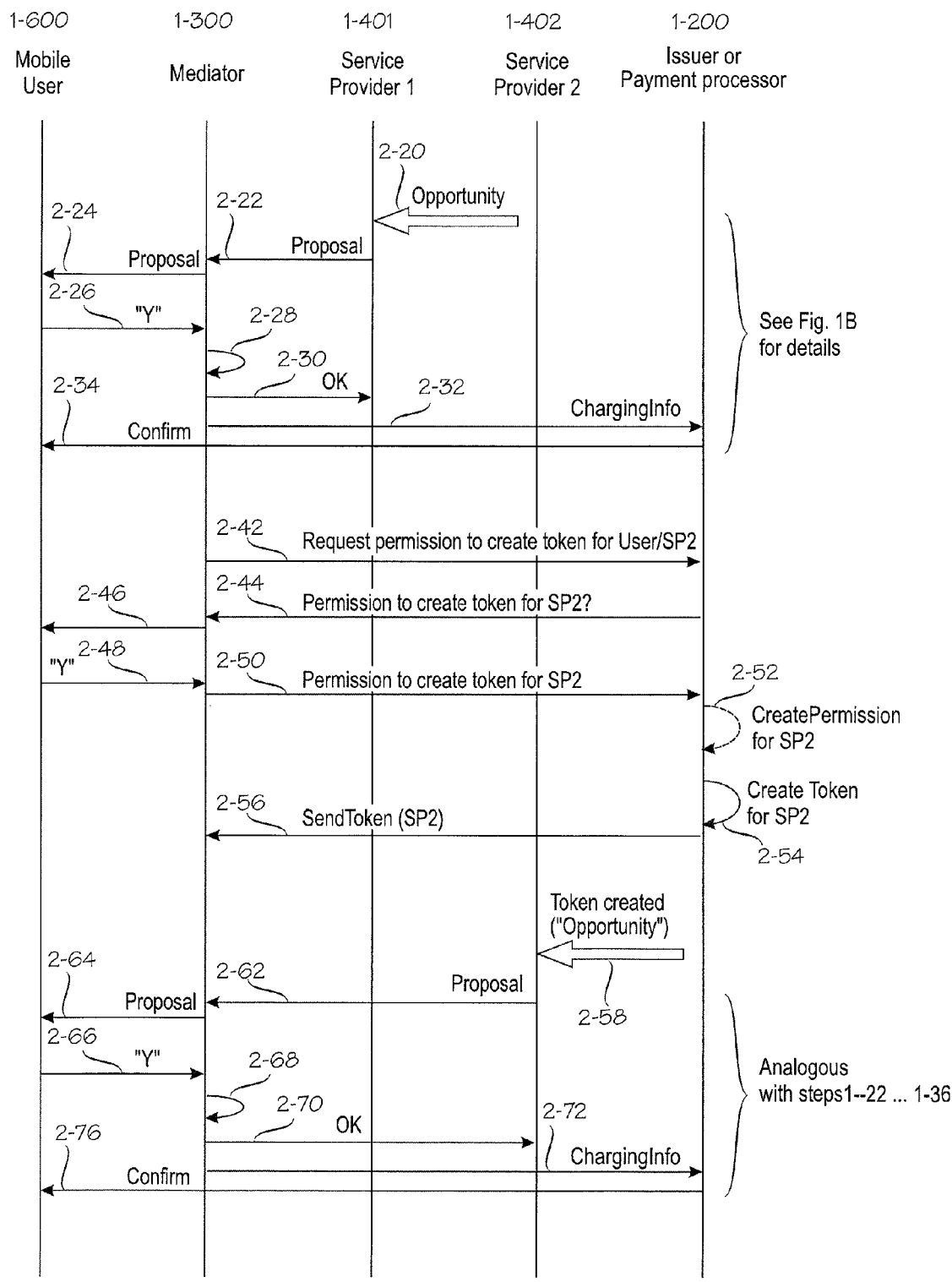

FIGS. 1, 2A and 2B illustrate how embodiments of the invention can be configured to cooperate with other legal entities to form a complex framework which facilitates provisioning of services and payments. The following description of this complex framework will illustrate a multiplicity of ideas concerning authentication. One of the ideas is that modern e-commerce involves a number of cooperating entities and, naturally, a number of mutual authentication issues. Another idea to be illustrated is that there are a number of different situations which pose varying requirements for the authentication process, particularly as regards security and convenience, which should be appropriately balanced. A yet further idea to be illustrated is that despite the large number of entities involved, it is possible for a centralized authentication server to perform authentication with respect to many or all of the entities.

Specifically, FIGS. 1, 2A and 2B illustrate various features in a complex use case wherein a mobile subscriber, who is also a holder of one or more payment cards, uses at least one communication terminal for authentication and authorization of recurring mobile payments from the user's credit card account via a payment card issuer or payment processor to a merchant operating a service provider. As used herein, a mobile payment refers to a payment transaction effected at least partially over a mobile network. A recurring mobile payment is a mobile payment occurring more than once. Typically information on a previous transaction is utilized to make a subsequent transaction more convenient or effective. The reasonably complex use cases shown herein illustrate the fact that there are a number of variables affecting the level of security required of an authentication process.

FIG. 1 is a block diagram of an embodiment of the invention, which can be used to authorize mobile payments, while FIGS. 2A and 2B are signaling diagram illustrating series of events in the system shown in FIG. 1. FIG. 1 illustrates an implementation wherein a centralized authentication server, called a mediator 1-300, is located in a PCI-compliant environment 1-100, wherein "PCI" stands for Payment Card Industry. Compliance specifications for the PCI-compliant environment 1-100 are published by PCI Security Standards Council, currently on address www.pcisecuritystandards.org. From a pure technical standpoint, it is not at all necessary to implement a PCI-compliant environment or to install the mediator in it, but this implementation helps other entities, such as payment processors and merchants to trust the mediator 1-300.

Other elements in the PCI-compliant environment 1-100 include a payment processor 1-200, its associated database 1-202 and at least one merchant 1-250 as a legal entity. The database 1-202 stores general account and address information 1-210 on the users and merchants. While storing such information is considered good housekeeping for auditing or the like, it is strictly speaking not essential for the present embodiment.

Some of the merchants 1-250 operate respective online stores or service providers 1-400, 1-401 through 1-40n outside the PCI-compliant environment 1-100. When a representative service provider is discussed, reference numeral 1-400 is generally used, while reference numerals 1-401 through 1-40n may be used when individual service providers need to be referenced. An important element outside the PCI-compliant environment 1-100 is naturally the users, a representative one of whom is denoted by reference number 1-600.

In the present embodiment, the user 1-600 has multiple roles. Firstly, the user is a customer of the payment processor 1-200 and accordingly, a holder of one or more payment cards, one of which is denoted by reference numeral 1-610. While reference numeral 1-610 denotes the payment card, reference numeral 1-612 denotes the information on the payment card 1-610 that suffices to globally identify the payment card. In other words, absent additional authentication measures, such as those taught in the present description, knowledge of the complete information 1-612 enables anyone having that knowledge to make payments (honest or fraudulent) that may be chargeable to the holder of the payment card 1-610. The user 1-600 is also a subscriber of a mobile access network 1-500 and a user of at least one mobile terminal 1-620.

When the system according to FIG. 1 is put into use, the following assumption and conditions are in force:
1. There is an initial trust relation between the payment processor 1-200 and mediator 1-300. For instance the trust relation may be established by legal contracts signed between the operators (as legal entities) of the processor 1-200 and mediator 1-300, and the legal entities instruct the processor 1-200 and mediator 1-300 (as network nodes) to trust each other. As used herein, an "initial trust relation" may mean, for instance, the payment processor 1-200 authorized the mediator 1-300 to process transactions within a set of initial limits. During operation of the system, the limits may be increased.
2. There is an initial trust relation between each service provider 1-401-1-40n and the payment processor 1-200.

There is also an initial trust relation between each service provider 1-401-1-40n and the mediator 1-300.
3. There is an initial trust relation between the payment processor 1-200 and the user 1-600 as a holder of one or more payment cards 1-610.
4. There is an initial trust relation between the mediator 1-300 and the user 1-600 as a mobile subscriber using mobile terminal 1-620.

The set of initial trust relations have a few gaps, however. Firstly, in use cases wherein the payment processor 1-200 operates in the PCI-compliant environment 1-100, it is imperative that the complete credit card information 1-612 (that is, information sufficient to make fraudulent purchases) is not conveyed outside of the PCI-compliant environment. This means, for instance, that although the mediator 1-300 is trusted to mediate payment card transactions between service providers and mobile users (as payment card holders), the mediator must be able to operate without information that globally identifies the users' payment cards. Furthermore, it is an open question of what links each user's payment card(s) 1-610 and mobile terminal(s) 1-620.

It is another open question of how the various service providers 1-401 through 1-40n, or a subset of them providing mutually related services, can be authorized to offer services to a user 1-600 that has authorized mobile transactions from one service provider.

Referring now to FIG. 2A, an exemplary use case involving an initial transaction to an individual service provider will be described next. In step 2-2 the user 1-600 performs a registration to the web site of the processor 1-200. In the registration, the user 1-600 authorizes an exemplary service provider 1-401 to offer services that may be charged against the user's payment card 1-610. For instance, the registration may be performed over the internet by utilizing any internet-enabled terminal. Modern smartphones may be utilized as browsers or internet-enabled terminals, but a distinction should be made between the phone function and the browser function. The phone function is typically authenticated by utilizing a subscriber identity module (SIM), while the browser function is authenticated separately, typically by utilizing a username/password combination which, during initial registration, may be confirmed by sending a confirmation link to the user's e-mail account, for example. In some implementations, the initial registration 2-2 may require bank authentication or some other form of strong authentication, while subsequent uses, such as configuration changes, may require lesser authentication, such as a user ID/password combination that is issued during the initial registration 2-2.

In order to authorize recurring mobile payments, the user effectively gives a permission for a service provider 1-401 to offer services to the user 1-600, by referencing the payment card 1-610. In step 2-4, the processor 1-200 stores information on the permission given by the user 1-600. For instance, the processor 1-200 may store an information tuple 1-212 that comprises the user's true identity, mobile identity, payment card number and the service provider's identity. Again, the information tuple 1-212 is considered good housekeeping for auditing purposes while, strictly speaking, it is not absolutely necessary to effect payments.

In step 2-6 the processor 1-200 creates a "token" 1-214 that indicates to the mediator 1-300 that the information tuple 1-212 has been established. For the purposes of the present embodiment, the token 1-214 is a filtered or reduced version of the information tuple 1-212 that fully identifies the permission given by the user 1-600 to the service provider. For instance, the full identification information 1-612 on the user's payment card(s) may not be conveyed to entities outside the PCI-compliant environment. Instead of the full identification information 1-612, the token 1-614 only contains sufficient information to identify a specific payment card 1-610 to the user/card holder 1-600. In the present context, such information is shown as "PaymentCardREF" in the drawings, as this information item enables the mediator to reference the specific payment card 1-610 to the user/card holder 1-600. In the example shown, the "PaymentCardREF" information item may have a value of "V1SA_4567", whereby it identifies the specific payment card among the present user's payment cards but fails to globally identify the payment card. In step 2-8, the issuer/payment processor 1-200 sends the token 1-214 to the mediator 1-300. In an optional step 2-10, the issuer/payment processor sends the token to the service provider 1-401.

In step 2-20, the service provider 1-401 detects an opportunity to send a service offer to the mobile terminal 1-620 of the user 1-600. There are many ways for the service provider 1-401 detect such an opportunity. For instance, service provider 1-401 may detect that the user is about to request or has requested some service(s) from the service provider, and the service provider may offer some related service(s) to the user. Alternatively or additionally, the user 1-600 may navigate to the service provider's web site and request information on services, thereby permitting sending of service offers to the user's mobile terminal. In step 2-22 the service provider 1-401 sends a service proposal to the mediator 1-300. The service proposal 2-22 contains an identifier of the token 1-214 that was created in step 2-6. The service proposal 2-22 further contains details of the offer, such as what is being offered and at what price, etc. In step 2-24 the mediator 1-300 reformats the offer and relays it to the user's mobile terminal 1-620. In addition to the details of the offer, the reformatted offer 2-24 contains the "PaymentCardREF" information item, which only identifies the payment card to the user/card holder 1-600 but fails to globally identify it. While the reformatted offer 2-24 is sent to the user's mobile terminal 1-620, the service provider 1-401 does not have to send the mobile ID to the mediator 1-300 because the mobile ID can be obtained from the token 1-214 that was sent to the mediator in step 2-8.

In step 2-26 the user 1-600 responds from their mobile terminal 1-620. Assuming that the DDM technique described elsewhere in this patent specification is used, the user 1-600 user only has to send a "Y" for "Yes" and anything else (including no response) for "No", for example. Similarly, the offer may contain a list of choices (e.g. A, B, C, D) from which the user selects one by replying a "A" for choice A. Even if multiple service providers 1-401-1-40n are sending multiple offers each, the DDM technique keeps track of which response from the user corresponds to which service offer from which service provider. In step 2-28, the mediator 1-300 utilizes the DDM technique and thereby identifies which service offer the user is responding to. In optional steps 2-30 and 2-32 the mediator 1-300 may request acceptance from the issuer/service provider 1-200, which may perform a credit check, for example. If the outcome of the credit check is positive, the issuer/service provider 1-200 provides an acceptance to the mediator's request. The exchange of messages 2-30 and 2-32 serves two purposes. Firstly, the mediator conveys information on the user's acceptance to the issuer/payment processor 1-200 for charging purposes, and secondly, the mediator requests the issuer/payment processor 1-200 to carry any credit or security checks compliant with the policies of the issuer/payment processor. In step 2-34, provided that the outcome of the check(s) is positive, the mediator 1-300 forwards the user's acceptance to the service provider 1-401.

In step 2-36, the mediator, the issuer/service provider and/or the service provider may send a confirmation to the mobile user/card holder 1-600. Strictly speaking, the confirmation is considered good manners and good housekeeping, but is not absolutely essential for providing the requested service. In some implementations the steps 2-32 through 2-36 may be executed in different orders and/or by different entities. As is apparent from the drawing, after step 2-34, each of the mediator, issuer/service provider and/or service provider know equally well that everything is in order, and any entity can send the confirmation to the user.

While the above steps 2-2 through 2-34 suffice to establish recurring payments in respect of one mobile user/terminal and one service provider, there is a desire to facilitate combining service offerings from multiple related service providers. For instance, assume that the service provider 1-401 is an airline carrier. Under this assumption, the opportunity-detecting step 2-20 may be implemented such that airline carrier is an example of a merchant 1-250 inside the PCI-compliant environment 1-100, and this entity notifies the service provider 1-401, which is an example of an online store outside the PCI-compliant environment 1-100.

Referring now to FIG. 2B, steps 2-20 through 2-34 have already been described in connection with FIG. 2A, and a duplicate description is omitted. The steps 2-20 through 2-34 are repeated in FIG. 2B for the reader's convenience, with abbreviated legends.

The second major section in FIG. 2B, namely steps 2-42 through 2-56, relate to creation of a token for recurring payments from the user 1-600 to service provider 2, 1-402. What these steps accomplish, is largely analogous with creation of the token for recurring payments from the user 1-600 to service provider 1, 1-401, that was described in connection with FIG. 2A (see steps 2-2 through 2-8 for details). The actual implementation is different, however. In the token-creation phase of FIG. 2B, steps 2-42 . . . 2-56, it is not the user 1-600 who has the initiative but the mediator 1-300. Accordingly, the user need not explicitly register mobile payments for each individual service provider. On the other hand, creation of the token for the user and service provider 2 is not completely beyond the control of the user either. In a preferred implementation, the user's permission to create a token for related service providers is requested but inconvenience to the user should be restricted to the minimum. Steps 2-42 through 2-56 illustrate one way of accomplishing that.

As a result of step 2-26, the mediator 1-300 knows that the user 1-600 has authorized mobile payments for services from service provider 1, 1-401. The mediator 1-300 now uses this piece of information and, in step 2-42, prompts the processor 1-200 to request permission to create a token for the combination of user 1-600 and service provider 2, 1-402. In step 2-44 the processor 1-200 requests permission from the user 1-600 to create the token. In step 2-46 the mediator 1-300 relays the request to the mobile terminal 1-620 of the user 1-600. In the present example, the user accepts the creation of the token and sends an affirmative response (eg "Y") in step 2-48. In step 2-50 the user's permission to create the token is conveyed to the processor 1-200, which creates a record indicating the user's permission in step 2-52. In step 2-54 the payment processor creates the actual token, which is sent to the mediator in step 2-56. The three last steps of this phase, namely steps 2-52 through 2-56 are similar to the respective steps 2-4 through 2-6 in which the first token was created in FIG. 2A.

The difference to steps 2-4 through 2-6 of FIG. 2A is that in FIG. 2B it is the mediator that initiates the token-creation process, based on the knowledge that the user has requested service (and accepted charging) from service provider 1, for which the mediator is aware of related service providers. The mediator does not have all the required information for the token-creation process, nor does it need to have. Instead, the mediator only needs to know that a token for the combination of the user 1-600 and service provider 2, 1-402 should be created, or that permission for its creation should be requested from the user. The remaining details for the user's permission and token, most notably the payment card identification information 1-612, are known by the processor 1-200.

It is also worth noting here that the user needs to authenticate him/herself and/or specify which offers from multiple simultaneous service offers from one or more service providers are accepted and which are declined. It is possible to utilize the DDM technique described earlier in this specification to provide authentication and/or matching user responses to service offerings. In some implementations the DDM technique may be omitted, at least for low-valued transactions and/or in connection with users with good history.

As a result of the token-creation process that was notified to the mediator in step 2-56, service provider 2, 1-402 is now notified of the creation of the token. This notification step 2-58 deliberately leaves open the question of which entity sends the notification. Depending on implementation, the notification can be sent from the processor 1-200 or mediator 1-300 as they both have the same information available.

Steps 2-62 through 2-76, in which the service provider 2, 1-402 sends an offer to the user 1-600 and the user accepts, are analogous with the respective steps 2-22 through 2-34, the sole difference being the service provider. In the first case (steps 2-22 through 2-34) it was service provider 1, while in the latter case (steps 2-62 through 2-76) it was service provider 2.

The fact that the mediator 1-300 resides inside the PCI-compliant environment and complies with the PCI specifications and certifications may have a variety of different implementations. For instance, the mediator may be implemented and operated by a legal entity whose employees undergo security clearance. Alternatively or additionally, the mediator, or at least critical portions of it, are programmed or monitored by one or more well-trusted parties, and the integrity of the mediator is verified with cryptographic techniques, such as digital certificates. Alternatively or additionally, some critical portions of the mediator may be firmware coded in a manner similarly to mobile SIM cards, which are authenticated by using a challenge-response mechanism. The software, which includes the trust-critical parts of the mediator functionality and the challenge-response mechanism, may be coded into firmware from which the mediator (as proxy server) may execute it.

2. Exemplary Hardware Platforms

Figure 3:
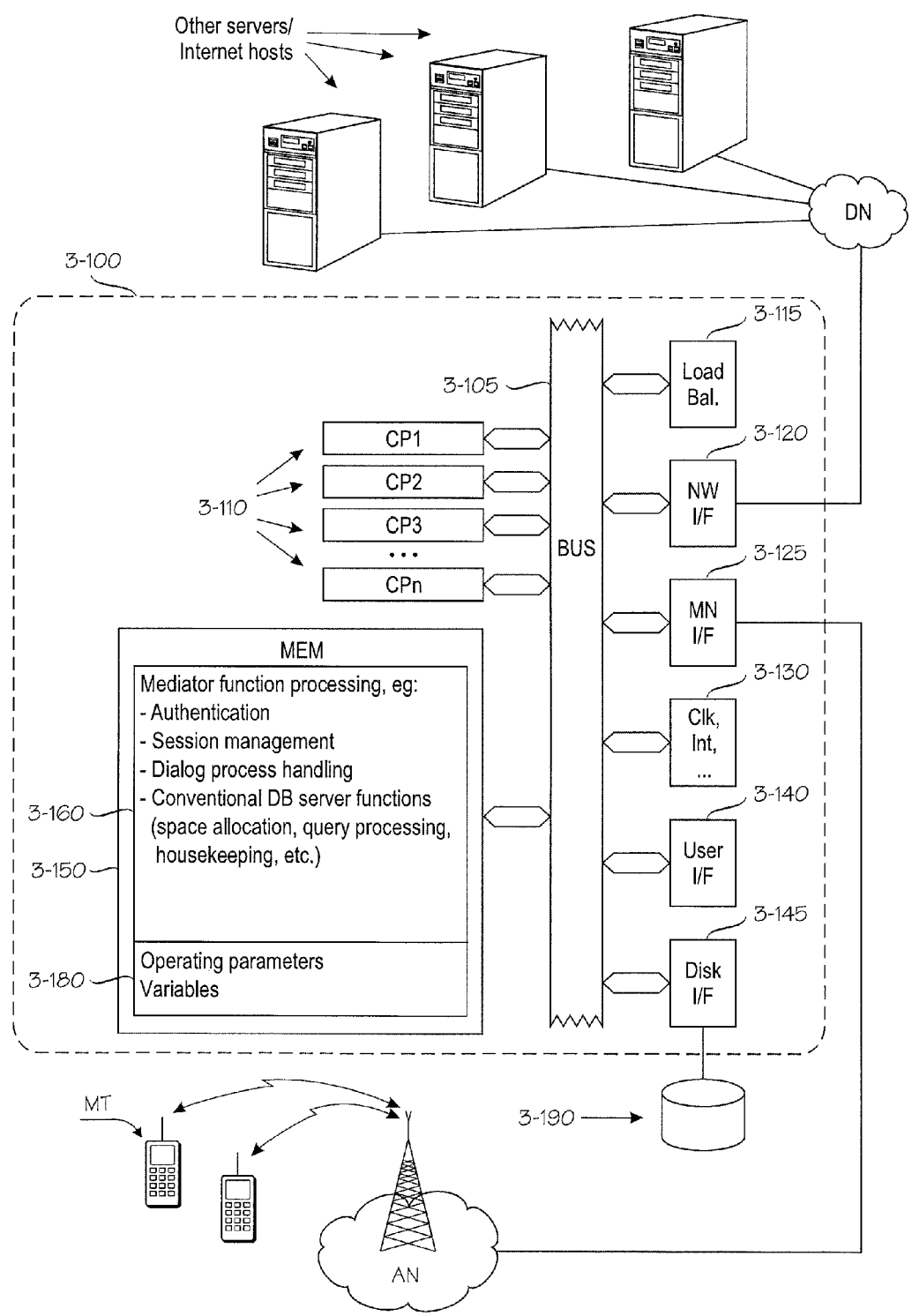
FIG. 3 shows an exemplary block diagram for the various information processing and/or mediating servers in the systems described earlier.

FIG. 3 schematically shows an exemplary block diagram for the various information processing and/or mediating servers in the systems described earlier. For instance, such a server architecture, generally denoted by reference numeral 3-100, can be used to implement the mediator 1-300 and/or the servers for the issuers/payment processors and the service providers. The two major functional blocks depicted herein are a server computer 3-100 and a storage system 3-190. The server computer 3-100 comprises one or more central processing units CP1 . . . CPn, generally denoted by reference numeral 3-110. Embodiments comprising multiple processing units 3-110 are preferably provided with a load balancing unit 3-115 that balances processing load among the multiple processing units 3-110. The multiple processing units 3-110 may be implemented as separate processor components or as physical processor cores or virtual processors within a single component case. The server computer 3-100 further comprises a network interface 3-120 for communicating with various data networks, which are generally denoted by reference sign DN. The data networks DN may include local-area networks, such as an Ethernet network, and/or wide-area networks, such as the internet. Assuming that the server computer 3-100 acts as a mediator 1-300, it may cooperate with other servers via the data networks DN. Reference numeral 3-125 denotes a mobile network interface, through which the server computer 3-100 may communicate with various access networks AN, which in turn serve the mobile terminals MT used by end users or clients.

The server computer 3-100 of the present embodiment may also comprise a local user interface 3-140. Depending on implementation, the user interface 3-140 may comprise local input-output circuitry for a local user interface, such as a keyboard, mouse and display (not shown). Alternatively or additionally, management of the server computer 3-100 may be implemented remotely, by utilizing the network interface 3-120 and any internet-enabled terminal that provides a user interface. The nature of the user interface depends on which kind of computer is used to implement the server computer 3-100. If the server computer 3-100 is a dedicated computer, it may not need a local user interface, and the server computer 3-100 may be managed remotely, such as from a web browser over the internet, for example. Such remote management may be accomplished via the same network interface 3-120 that the server computer utilizes for traffic between itself and the client terminals.

The server computer 3-100 also comprises memory 3-150 for storing a program suite 3-160 or program instructions, and operating parameters and variables 3-180. Reference numeral 3-160 denotes a program suite for the server computer 3-100.

The server computer 3-100 also comprises circuitry for various clocks, interrupts and the like, and these are generally depicted by reference numeral 3-130. The server computer 3-100 further comprises a storage interface 3-145 to the storage system 3-190. When the server computer 3-100 is switched off, the storage system 3-190 may store the software that implements the processing functions, and on power-up, the software is read into semiconductor memory 3-150. The storage system 3-190 also retains operating parameters and variables over power-off periods. In large-volume implementations, that is, implementations wherein a single server computer 3-100 serves a large number of clients via respective mobile terminals MT, the storage system 3-190 may be used to store the dynamic dialog matrices associated with the clients and mobile terminals MT. The various elements 3-110 through 3-150 intercommunicate via a bus 3-105, which carries address signals, data signals and control signals, as is well known to those skilled in the art.

The inventive techniques may be implemented in the server computer 3-100 as follows. The program suite 3-160 comprises program code instructions for instructing the set of processors 3-110 to execute the functions of the inventive method, including authentication and, optionally, cooperating with other servers for enhanced service provisioning.

Figure 4:
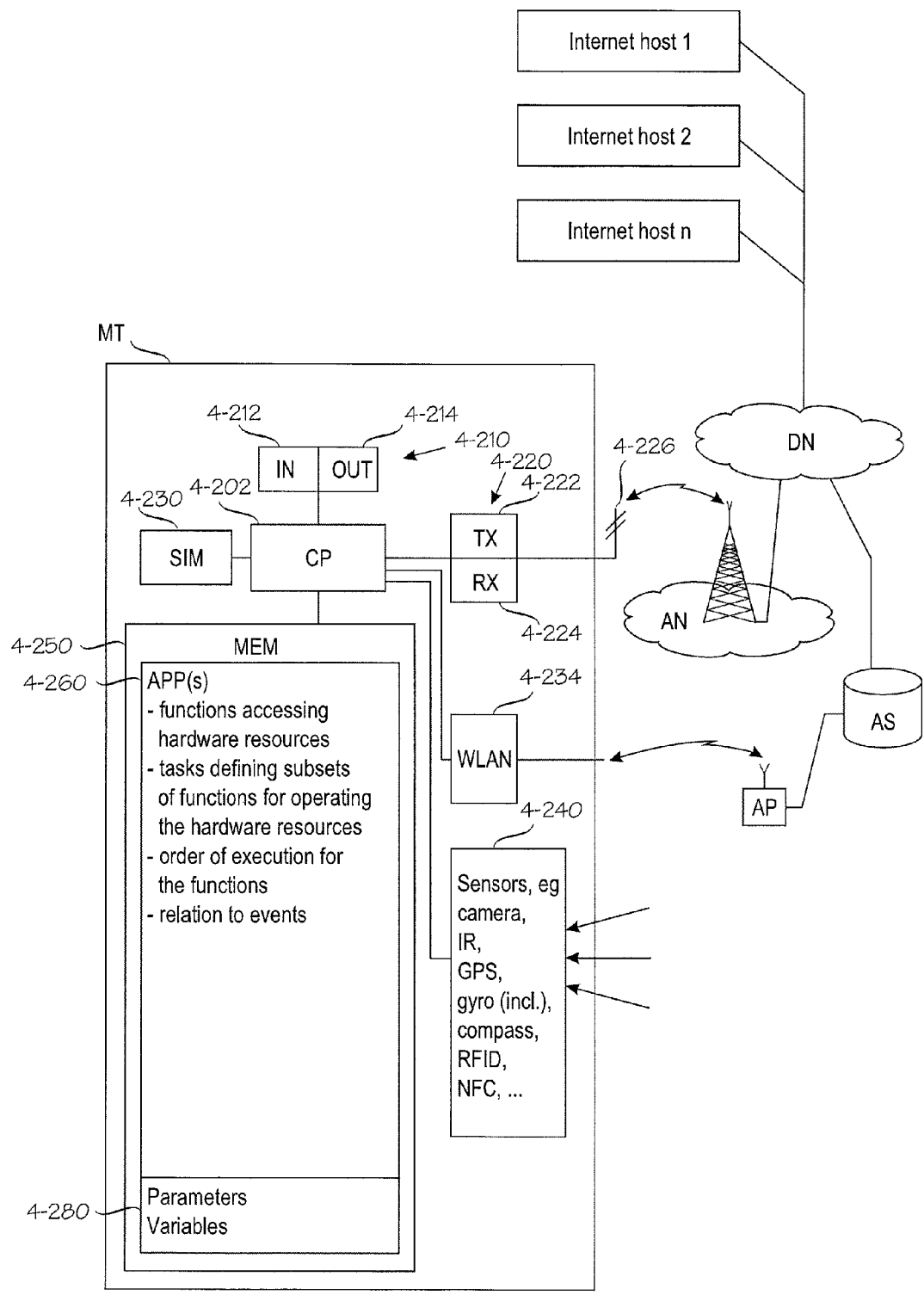
FIG. 4 shows a schematic block diagram of a mobile terminal.

FIG. 4 shows a schematic block diagram of a mobile terminal. The mobile terminal MT comprises a processing system 4-202 with at least one central processing unit. The mobile terminal further comprises a memory system 4-250, which typically comprises a combination of fast volatile memory and slower nonvolatile memory, as is well known to those skilled in the art. In addition, the mobile terminal MT comprises or utilizes a user interface 4-210, which comprises an input circuitry 4-212 and an output circuitry 4-214. The input circuitry 4-212 comprises the mobile terminal's microphone and user-input devices, such as a keypad and/or touch screen. The output circuitry 4-214 comprises the mobile terminal's display and earphone or loudspeaker. The mobile terminal MT further comprises reception/transmission circuitry 4-220 which comprises a transmission circuitry 4-222, reception circuitry 4-224 and antenna 4-226. A subscriber identity module, SIM, 4-230 is used by an authentication function to authenticate the mobile terminal's user and to identify the user's subscription to the access network AN. A typical modern mobile terminal also comprises WLAN (Wireless Local Area Network) circuitry 4-234 which enables the mobile terminal to act as a WLAN client to a WLAN access point AP.

In order to support installable program modules, the mobile terminal's memory 4-250 typically comprises routines for downloading installable program modules and for storing the installable program modules as apps (applications) 4-260 in the memory 4-250 for execution by the central processing unit CP. FIG. 4 shows an arrangement in which the mobile terminal is configured to download installable program modules from a vendor-specific or platform-specific app store AS via a data network DN, an access network AN, the antenna 4-226 and reception circuitry 4-224. Instead of downloading software from the app store over the access network, or in addition to it, other arrangements are equally possible, such as downloading the installable program modules via the data network DN to a separate data terminal (not shown), from which the installable program modules are transferred to the mobile terminal the WLAN circuitry 4-234 or via some other short-range connection, such as Bluetooth or Universal Serial Bus (USB, not shown). The access network AN is typically a broadband-capable mobile communication network, while the data network DN is typically the internet or some closed subnetwork implementing internet protocol (IP), commonly called intranets or extranets. At this level of generalization, all previously-discussed elements of FIG. 4 can be conventional as used in the relevant art. One or more external hosts are accessible via the access network AN and data network DN, as will be described in more detail below. Finally, reference numeral 4-280 denotes an area of the memory 4-250 used to store parameters and temporary variables.

In addition to the user interface 4-210, the mobile terminal typically comprises optional sensors 4-240 for detecting environmental variables or parameters. A non-exhaustive list of sensors 4-240 includes a camera, IR (infrared) detection/communication circuitry, GPS and/or other location-determination circuitry, compass, gyroscope (inclination sensor), RFID (radio frequency identification) and/or NFC (near-field communication) circuitry, or the like.

By virtue of the sensors 4-240, apps 4-260 being executed in the mobile terminal can collect information on the environment, surrounding, location and or orientation of the mobile terminal. Such sensor-based information is collectively called sensory information. The apps 4-260 comprises program-implemented functions which are used to operate the sensors. Depending on the app(s) being executed, the mobile terminal may be set up to collect such sensory information in response to user control, spontaneously and/or progressively, such that detection of one type of sensory information triggers the app 4-260 to instruct the mobile terminal to collect further information, sensory or otherwise. By way of an illustrative but non-restrictive example, a primary source of sensory information may comprise local radiation which the mobile terminal can use to determine that it is proximate to an object of interest or known location. Detection of such locally constrained radiation may be used to authenticate the user's location (ie, verify that the user was at a location where the locally constrained radiation could be received). For instance, the locally constrained radiation may be varied over time. The fact that an authentication app operating in a mobile terminal captures a locally constrained radiation, and stores relevant information content of the radiation, proves that the mobile terminal was in the range of the radiation at a time when the captured content was transmitted.

Detection of the locally constrained radiation, such as infrared, Bluetooth or near-field communication may trigger the app to collect orientation-related sensory information from the sensors 4-240, such as a compass heading and/or gyroscope/inclination information, and optionally, accurate GPS information. The mobile terminal's location, orientation and information on nearby objects of interest may be used as aspects of authentication. For instance, a scene captured by the mobile terminal's camera may indicate, although not with absolute certainty, that the mobile terminal was at a location where the scene could be captured.

3. Exemplary Authentication Techniques

FIGS. 1 and 2A-2B and their descriptions demonstrated how authentication can be required in a wide variety of situations, ranging from establishing new accounts to relatively simple incremental purchases. In the earlier examples, a mobile terminal user authorized a number of payments and, naturally, the person who authorized the payments needs be authenticated. The techniques described herein can also be used in authentication processes that are not related to financial transactions. For instance, an online voting process is another example of a case wherein voters need to be authenticated.

FIGS. 3 and 4 and their descriptions illustrated hardware platforms suitable for implementing servers or mediators and mobile terminals. The following disclosure illustrates how a mobile terminal platform can be utilized to improve known authentication schemes.

Figure 5:
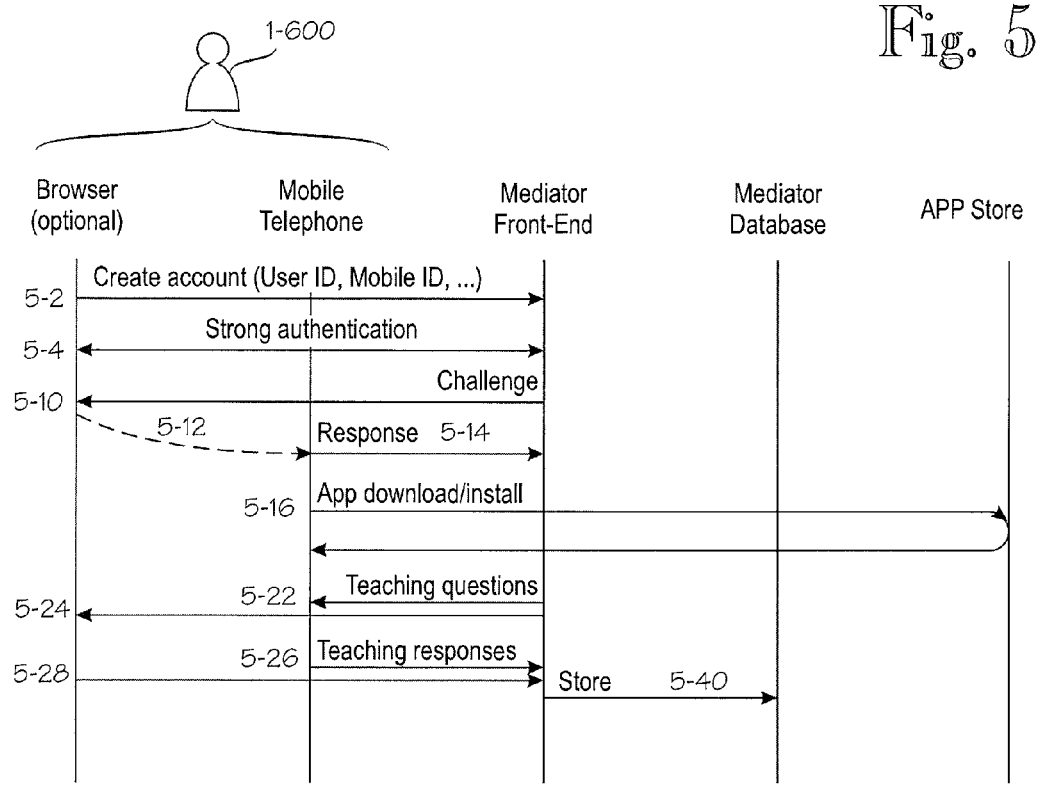
FIG. 5 shows how a user can, optionally, use both an internet browser and a mobile telephone in a teaching phase that precedes authentication.

Referring now to FIG. 5, an exemplary teaching phase will be described. FIG. 5 shows how a user 1-600 can, optionally, use both an internet browser and a mobile telephone in the teaching phase. As stated earlier, the browser function and the telephone function can be implemented in a single physical terminal or in distinct physical terminals. Reasons for using a general-purpose computer as the browser may include a desire to use a bigger keyboard and display than what can be offered by a telephone, or a desire to use a smart card reader coupled to the general-purpose computer for strong authentication.

Steps 5-2 through 5-16 relate to well-known techniques in the art and only an abbreviated description is provided. In step 5-2 the user 1-600 begins a process to create a new user account. According to an optional feature of the present example, the user 1-600 communicates with a server acting as a front-end to a mediator 1-300. As part of the teaching process, the front-end stores results of the teaching to a database accessible to the mediator. By using a distinct front-end, the actual mediator need not be burdened with the teaching phase. The user 1-600 enters their identification details, such as full name, address, e-mail address, mobile identity, or the like, that are required to identify and address the user. In order to effect financial transactions by using payment cards, the user typically enters payment card details, as stated in connection with FIGS. 1 and 2A-2B. In step 5-4 the front-end typically performs a strong authentication with respect to the user. For instance, bank authentication and/or smartcard certificates and PIN signatures may be used for this purpose.

Steps 5-10 through 5-14 relate to coupling of a mobile identity to the newly-created user account. In step 5-10 the mediator front-end sends a challenge word, such as a randomized character string, to the browser. In step 5-12 the user copies the randomized character string to the mobile terminal and sends it from the mobile terminal in step 5-14. Now the mediator front end has verified that the mobile identity entered in step 5-2 actually belongs to the person who initiated the account creation in step 5-2. Because mobile identities are enforced by PIN codes, steps 5-10 through 5-14 help strengthen the first authentication process.

In step 5-16, an authentication application ("app") is downloaded and installed from a vendor-specific or platform-specific app store. For instance, the front end may instruct the user 1-600 to navigate to the app store for downloading the authentication application, or the front-end may send the mobile terminal a link for this purpose. As a yet further alternative, the front end may request the app store to send a download link to the mobile terminal. Downloading and installing applications is well known in the art, and a detailed description is omitted.

In steps 5-22 and 5-24 the front end sends a number of teaching questions to the browser and/or the mobile terminal. In steps 5-26 and 5-28 the browser and/or the mobile terminal send responses to the teaching questions. Step 5-40 comprises storing the responses in a database. Some of the teaching questions belong in the first category on measurable physical characteristics of the user. The authentication app installed in the mobile terminal cooperates with the front-end for this purpose. For instance, assume that a photograph of the user's eye will be used as an item of the first category on measurable physical characteristics. The front-end and authentication app may cooperate in the following manner. In the present description the assumption is made that the authentication app is a "smart" app, ie, an app that needs very few detailed instructions from the front end. In one implementation, the front end requests the authentication app to return a photograph from the user's eye. The authentication app instructs the user to point the mobile terminal's camera to the user's left or right eye and activate the shutter (or the authentication app may activate the self-timer function). When the photograph has been captured, the authentication app locates the eye within the photograph, crops it appropriately and, optionally, checks the quality of the photo, by ensuring that adequate edge acuity is present. Alternatively, the authentication app may send whatever was captured to the front end for processing and quality assurance. The process may be repeated for the other eye.

Another example of the user's measurable physical characteristics, which may be captured by the mobile terminal in the teaching phase is a voice sample of the user, as captured by the mobile terminal's microphone.

It is worth noting that a single voice capture can provide information belonging in two categories. For instance, if the teaching phase involves instructing the user to speak or sing a favorite phrase of speech or song, the voice characteristics are measurable physical characteristics, while the knowledge of the user's password phrase or song is an example of knowledge possessed by the user. An intruder facing a challenge of uttering the legitimate user's favorite phrase or song would have to know what that phrase or song is and also replicate the legitimate user's voice.

Figure 6:
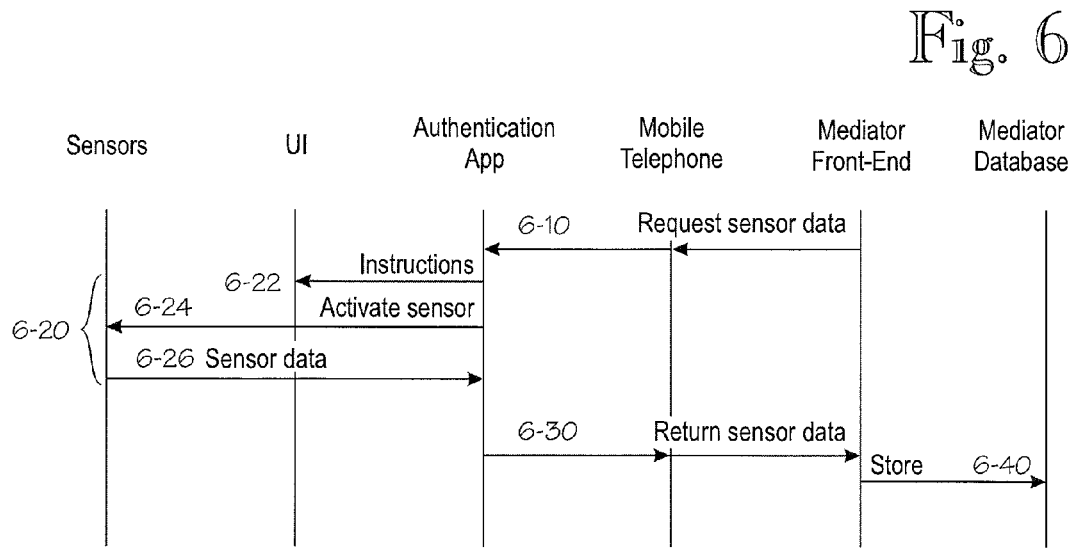
FIG. 6 is a signaling diagram illustrating how an authentication app downloaded and installed from an app store can cooperate with a mediator front-end in the teaching phase.

FIG. 6 is a signaling diagram illustrating how the authentication app downloaded and installed from the app store can cooperate with the mediator front-end in the teaching phase. In FIG. 6, the user's mobile terminal is divided among four sections. Mobile telephone refers to the communication capacity of the mobile terminal, Authentication app refers to the app that was downloaded and installed from the app store in step 5-16 of FIG. 5, UI refers to the mobile terminal's user interface, via which the authentication app can communicate with the user, and the section labeled Sensors refers to the various sensors of a modern smartphone. A non-exhaustive list of sensors which can be used in authentication includes camera, microphone, gyro (orientation or inclination sensor), positioning device, clock and touch-sensitive pad or display.

In step 6-10 the mediator front-end requests the authentication app to capture sensor data, which is characteristic of the user and/or knowledge possessed by the user. A photograph of the user or a part of the user, as captured by the mobile terminal's camera, is an illustrative example of sensor data that characterizes the user. A gesture captured by the mobile terminal's gyro (orientation or inclination sensor) or a rhythm captured by the mobile terminal's microphone or touch-sensitive pad or display is an illustrative example of sensor data that characterizes knowledge possessed by the user. A challenge to speak or sing the user's favorite phrase or song is an example of sensor data that represents the user's measurable voice characteristics plus knowledge of the legitimate user's favorite phrase or song.

Let us first assume that authentication app is configured to capture a set of photographs of the user. In step 6-22 the authentication app sends instructions to the user interface, so that the user knows what is expected of them. For instance, the authentication app may instruct the user to pinch their left earlobe with their right hand while holding the mobile terminal in their left hand in such a manner that the gesture can be captured with the camera. In step 6-24 the authentication app activates the mobile terminal's sensors, which in this example mean the camera. In step 6-26 the authentication app receives the sensor data (in this example: photograph). Steps 6-22 through 6-26 are collectively denoted by reference number 6-20. The series of steps 6-20 can be repeated any number of times, with different instructions and, optionally, different sensors. For instance, when a sufficient number of photographs of the user's characteristic parts (eg irises) and gestures (eg a silence gesture by keeping one's forefinger before the mouth) have been captured by the camera, the authentication app may instruct the user to produce the rhythm of a favorite piece of music. The rhythm may be captured by means of the mobile terminal's microphone, touch-sensitive input or gyro, for example. Again, the reason for controlling the authentication teaching phase from a mediator front-end, and not from the actual mediator, is a desire to burden the actual mediator as little as possible. In the scenarios described herein, the front-end stores results of the teaching phase in a database accessible to the mediator.

Figure 7:
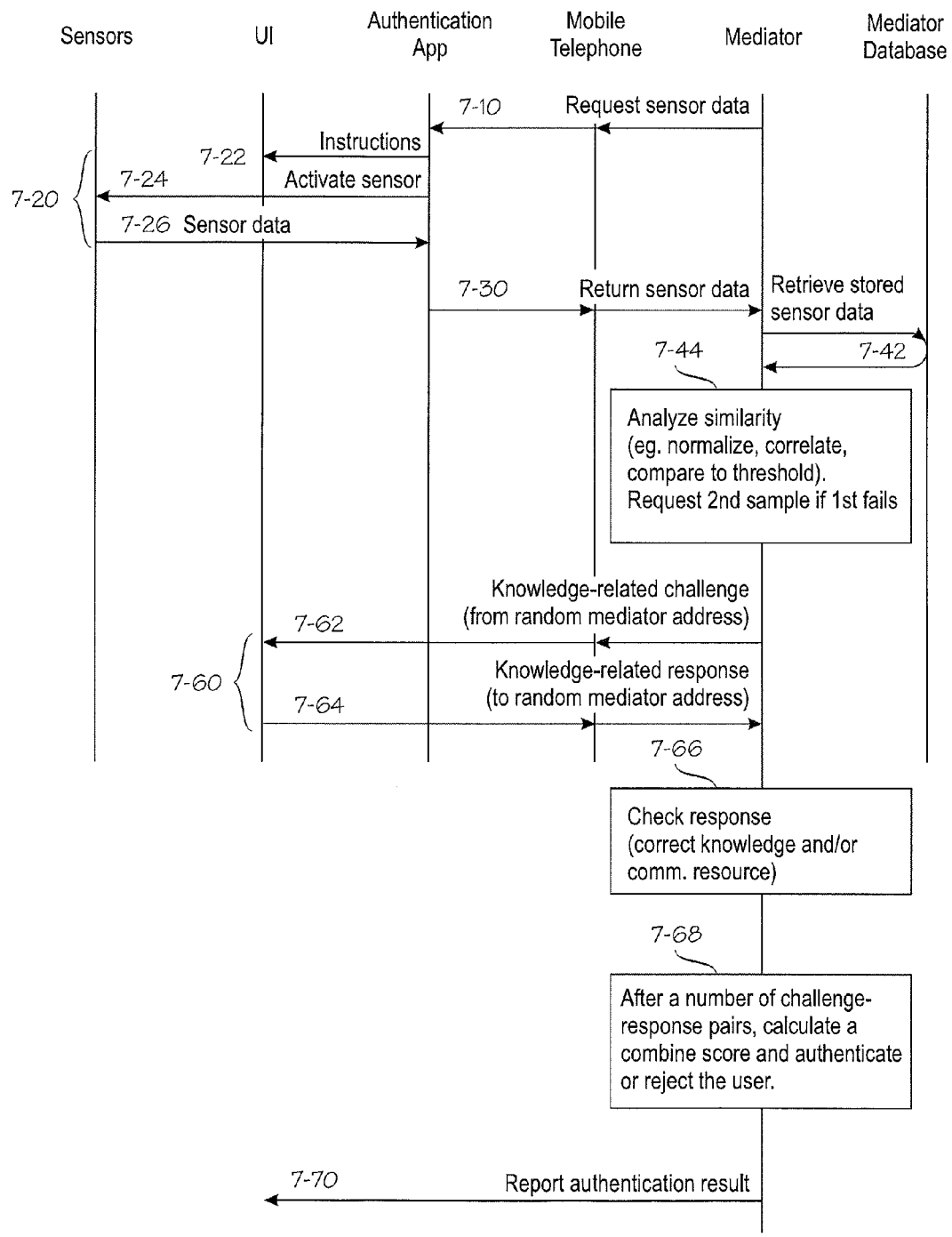
FIG. 7 is a signaling diagram illustrating how the authentication app can cooperate with the actual mediator in the authentication phase.

FIG. 7 is a signaling diagram illustrating how the authentication app can cooperate with the actual mediator in the authentication phase. Briefly stated, the authentication phase may comprise steps in which the mediator directs the authentication app installed in the mobile terminal to request sensor data, which represents measurable physical characteristics of the user and/or knowledge possessed by the user. These are steps 7-10 through 7-30, which are very similar to the corresponding steps shown in FIG. 6, and a duplicate description is omitted. The differences between steps 6-10 through 6-30 and steps 7-10 through 7-30 are, firstly, that FIGS. 6 and 7 relate to the teaching and authentications phases, respectively, and, secondly, that the authentication phase is controlled by the actual mediator, while the teaching phase, as shown in FIG. 6, was controlled by a mediator front-end to relieve the load of the actual mediator.

Instead of storing the returned sensor data to the database, as was done in the teaching phase (6-40), the mediator now retrieves previously stored sensor data from the database, step 7-42. In step 7-44, the sensor data set obtained in the authentication step is compared with the previously stored sensor data set. Since sensor data is never perfectly accurate or repeatable, this analysis is more fuzzy than a comparison of usernames and passwords. A typical act performed in the comparison step is normalization. For instance, samples of sensory data can be scaled in amplitude or volume such that the peak, average or root-mean-square (RMS) value of the sample obtains a nominal value.

The previously described steps of FIG. 7, namely steps 7-10 through 7-44, can be preceded or followed by other challenge-response cycles which relate to knowledge possessed by the user, or communication resource(s) available to the user, or both. Reference number 7-60 denotes such a challenge-response pair. In this example, the challenge-response pair 7-60 contributes to authentication by verifying both a knowledge possessed by the user and a communication resource available to the user. The present scenario is based on the assumption that at least one address of the user's mobile telephone has been taught to the mediator database in the teaching phase. The at least one address can indicate the user's telephone number (MSISDN), e-mail address, social network address, or the like. In step 7-62 the mediator sends the user's mobile terminal a knowledge-based challenge, such as a question concerning the user's first pet, house, car, boat, or the like. In this example, the mediator sends the challenge 7-62 from a randomly-selected mediator address. In step 7-64 the user responds by entering the requested knowledge and sends the response to the randomly-selected mediator address. For instance, the randomly-selected mediator address can be a number in the address space of a mobile network, and the medium may be a message in a mobile communications system, such as a short message (SMS), a multimedia message (MMS), or the like. Alternatively, the mediator can send a randomly-formatted link for responding to the user's e-mail address, which was taught to the mediator database in the teaching phase. In actual fact, the random addresses are properly managed by the mediator, but they appear to be randomized to the users and intruders. Only the person who has access to the legitimate user's mobile terminal or e-mail account can send a response (any response, correct or not) to the challenge. And only the person who knows which answer was taught to the mediator database in the teaching phase can send the correct response to the challenge. In step 7-66 the mediator checks the correctness of the response 7-64. The correctness check may relate to the information provided in the response and/or to the communication resource(s) used to transport the response. FIG. 7 depicts a signaling diagram in which the mediator bypasses the authentication app installed in the mobile terminal if the challenge-response pair does not involve collection of sensory data. In alternative implementations the authentication app may be utilized in all challenge-response pairs.

In step 7-68, if the user has been able to provide correct responses to all of the challenges, the mediator authenticates the user. If some of the responses were incorrect, the mediator may grant the user other attempts. Alternatively or additionally, some of the challenge-response pairs used in authentication do not have a rigid correct or false response. Particularly in connection with measured physical characteristics of the user or sensor-based authentication, the response provided in the authentication phase can never exactly match the response provided in the learning phase, and a correlation or other similarity measure should be employed. In some implementations, the authentication based on measured physical characteristics of the user may calculate a statistically representative measure, such as a median, average, or the like, of a number of challenge-response pairs, and positively authenticate the user if the statistically representative measure meets a given threshold.

In step 7-70 the mediator reports the result of the authentication to the parties of interest, which typically include the user and other entities, such as a service provider. For instance, if the purpose of the authentication was authorization of a payment, the mediator may inform the service provider that the user with a given user ID has passed the authentication.

Figure 8:
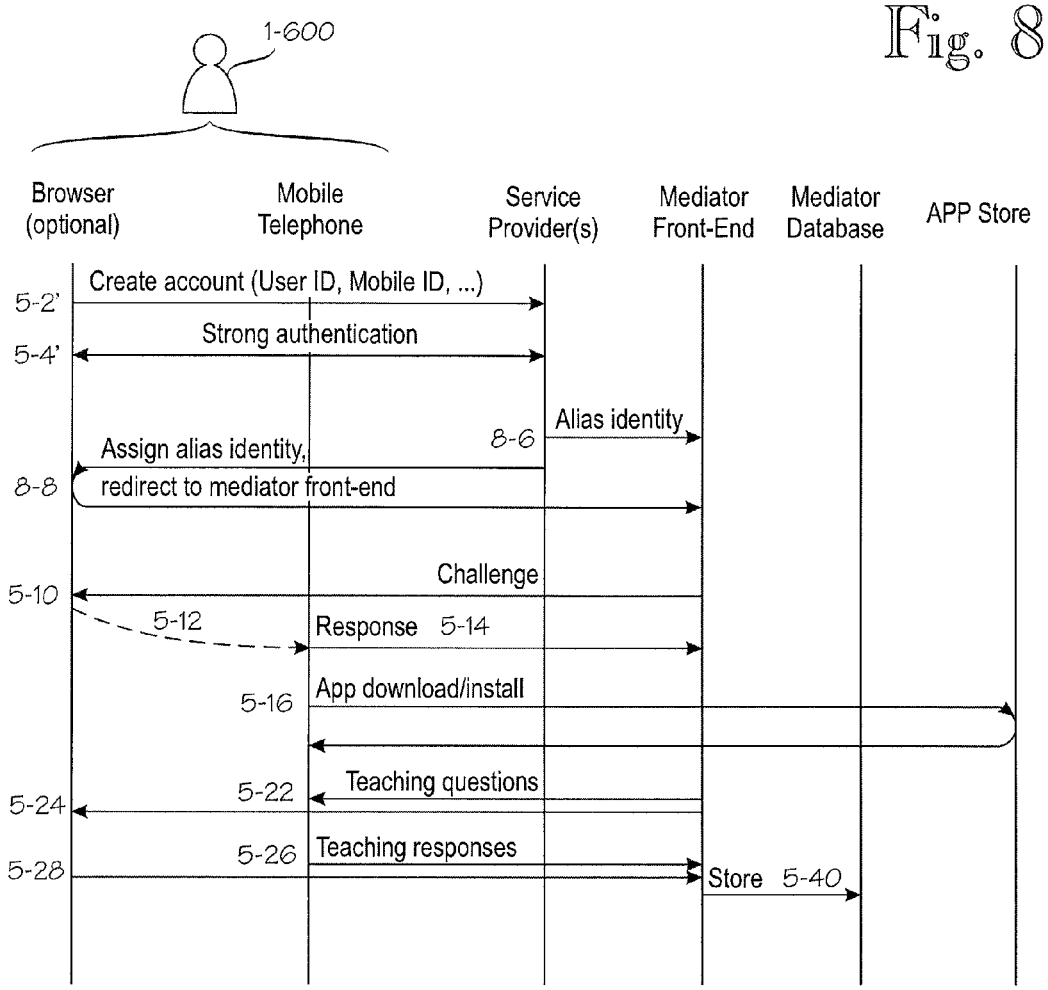
FIG. 8 is a variation of the scenario shown in FIG. 5, wherein a service provider organization performs the initial registration, assigns an alias identity to the user, and the mediator only knows the user's alias identity.

FIG. 8 is a variation of the scenario shown in FIG. 5, wherein a service provider organization performs the initial registration, assigns an alias identity to the user, and the mediator only knows the user's alias identity. In FIG. 8, method steps labeled "5-xx" are similar to those described in connection with FIG. 5, and a repeated description is omitted. The two first steps 5-2' and 5-4' are labeled with apostrophes because they differ from steps 5-2 and 5-4 of FIG. 5 in that in FIG. 8 these steps are performed by a service provider or an organization of service providers. In other words, the service provider(s) create an account for the user and perform initial authentication. Steps 8-6 and 8-8 are new and have no counterpart in FIG. 5. In these steps, which can be performed in either order, the service provider organization assigns an alias identity to the user, sends the alias identity to the mediator front end and to the user's terminal. The service provider organization also redirects the user's terminal to the mediator front-end, for example by sending the user's terminal a link to the mediator front-end. From this point on, the scenario shown in FIG. 8 is similar to the one shown in FIG. 5. When the authentication is complete, for instance as shown in step 7-70 in FIG. 7, the mediator will inform the interested parties, such as financial institutions, that the user with a given alias identity has passed the authentication.

The foregoing description of the authentication has focused on authentication of the user. Instead of, or in addition to, authenticating the user, the present disclosure can be utilized to authenticate the location the user claims to be in, or the place where the user is supposed to be. For instance, security officers whose task is to inspect a number of sites may prove their location by utilizing sensory data collected by the mobile terminal's sensors. Verifying the user's location is basically similar to authenticating the user's identity. Instead of collecting sensory data representative of the user, the mobile terminal and the authentication app installed in it can collect sensory data representative of location. For instance, GPS coordinates and/or photograph(s) captured at a certain time and place can be used to verify that the user was at that place at the given time.

The number of challenge-response cycles required for a given authentication process typically depends on a variety of factors, such as the value, risk or required confidence level associated with the transaction for which authentication is performed, the user's prior history, suspect activity (eg sudden hops from country to country in a short timespan), or the like.

Very strong authentication can be achieved by implementing various aspects and features of the present description. It is possible to achieve a level of security whereby the only way to steal a legitimate user's network identity is to steal the physical user and communication resources, by forcing the legitimate user to cooperate with criminals. Some embodiments of the mediator can prevent such identity thefts by implementing a feature in which some knowledge-based responses are interpreted as help! or alert! messages. If the mediator receives a number of such messages (eg one or two), the mediator may determine that the legitimate user has been kidnapped. The mediator may inform the police and/or request financial institutions to temporarily close the user's accounts.

The foregoing description, particularly in connection with FIGS. 1, 2A and 2B, relates to implementations in which a centralized mediator serves a number of service providers, payment card issuers, payment processors, authorities, or the like. Those skilled in the art will realize that it is possible to for individual entities, such as service providers, to implement and/or manage the mediator functionality. Nevertheless, a centralized mediator configured to serve a number of different entities has some benefits over distributed implementations wherein each entity manages their own authentication schemes. For instance, the centralized mediator is more convenient for the users because they only need to teach one authentication system. The centralized mediator is more convenient for the financial institutions, service providers and/or authorities because they do not have to maintain authentication systems at all. It is also possible to implement a hybrid authentication scheme in which users authenticate themselves to a financial institution by using bank codes, chip cards or other forms of strong authentication. As a result of this first authentication, the financial institution may create a user account and agree with the centralized mediator regarding authentication with respect to individual transactions.

REFERENCE DOCUMENTS

1. PCT application publication WO2004/019223
2. Commonly owned U.S. patent application Ser. No. 13/452,229

The contents of the reference documents are incorporated herein by reference.

The invention claimed is:
1. A data processing system comprising:
 a memory that stores program code instructions and data;
 a processing system including at least one processing unit, wherein the processing system executes at least a portion of the program code instructions and processes the data;
 wherein the memory includes at least one authentication element executable by the processing system, wherein the at least one authentication element instructs the processing system to:
  perform at least one teaching phase with respect to at least one user, wherein, in the at least one teaching phase, authentication information is collected for the user in at least two of the following at least three categories:
   a first category on measurable physical characteristics of the user including at least image data for an image of the user performing at least one physical gesture;
   a second category on communication resources provided by a mobile device associated with the user; and
   a third category on knowledge possessed by the user, and
  perform at least one authentication phase with respect to the at least one user, wherein, the at least two categories of collected authentication information comprises at least the first category,
 wherein, in the at least one authentication phase, at least a portion of the collected authentication information is used to formulate at least one challenge for presentation to the user,
 wherein at least one response to the formulated challenge is received from the user and correctness of the received response is determined based at least partially on comparison with at least a portion of the collected authentication information,
 wherein at least one correctness metric is calculated for the at least one response received from the user; and
 wherein the user is authenticated if the at least one calculated correctness metric meets or exceeds a first threshold value.

2. The data processing system of claim 1, wherein the user is an authentication subject whose identity is to be authenticated by the data processing system.

3. The data processing system of claim 2, wherein the memory includes at least one authentication element executable by the processing system, wherein the at least one authentication element is implemented in part on a server accessible to multiple users and at least one mobile device associated with the user to be authenticated.

4. The data processing system of claim 2, wherein the at least one authentication element operates in the mobile device associated with the user to be authenticated.

5. The data processing system of claim 1, wherein the user is associated with a mobile device having at least one network address.

6. The data processing system of claim 1, wherein the processing system includes at least one server accessible to multiple users with respective mobile devices and the at least one authentication element operates in the at least one server.

7. The data processing system of claim 1, wherein the first threshold value is based on a value and/or nature of a transaction for which the user's identity is to be authenticated.

8. The data processing system of claim 1, wherein the first threshold value is based on a prior history of the user.

9. The data processing system of claim 1, wherein the at least one authentication element instructs the processing system to:
 in the at least one teaching phase, collect authentication information for the user in three of the at least three categories; and
 in the at least one authentication phase, use the collected authentication information in three of the at least three categories.

10. The data processing system of claim 9, wherein the at least one authentication element instructs the processing system to collect and use the authentication information in at least three of the at least three categories if a value and/or nature of a transaction meets a set of predetermined criteria.

11. The data processing system of claim 1, wherein the at least one authentication element instructs the processing system to randomly select at least one category to be used in the at least authentication phase.

12. The data processing system of claim 1, wherein the authentication information in the first category further comprises at least one of biometric information and voice characteristics.

13. The data processing system of claim 12, wherein the biometric information comprises at least image data captured by the mobile device associated with the user.

14. The data processing system of claim 13, wherein the voice characteristics comprises at least one voice recording captured by the mobile device associated with the user.

15. The data processing system of 12, wherein the biometric information comprises image data associated with at least one of a user's face, and a user's iris.

16. The data processing system of claim 12, wherein the at least one authentication element is further configured to:
collect multiple data sets of biometric information;
randomly select at least one of the multiple data sets;
challenge the user to respond with captured image data that corresponds to the selected at least one data set.

17. The data processing system of claim 16, wherein at least some of the data sets comprise image data.

18. The data processing system of claim 1, wherein the authentication information in the second category comprises at least one of:
at least one cellular network address;
multiple different communication channels using the at least one cellular network address;
at least one e-mail address; and
at least one social network address.

19. The data processing system of claim 18, wherein the authentication information in the second category comprises multiple data sets, and wherein the at least one authentication element is configured to randomly select at least one of the multiple data sets.

20. The data processing system of claim 1, wherein the authentication information in the third category comprises at least one of:
username/password/PIN code;
factual questions/answers;
user's location; and
timing information.

21. The data processing system of claim 1, wherein the authentication information in the third category comprises multiple data sets and the at least one authentication element is configured to randomly select at least one of the multiple data sets.

22. The data processing system of claim 1, wherein the authentication of the user's identity is valid for only a specific place and/or time.

23. The data processing system of claim 1, wherein the at least one authentication element instructs the processing system to:
in the at least one teaching phase, associate at least one piece of authentication information to an indication of emergency; and
in the at least one authentication phase, respond to detection of the indication of emergency by notifying at least one authority of the emergency.

24. The data processing system of claim 1, wherein the communication resources provided by the mobile device associated with the user comprise at least one telecommunication resource.

25. The data processing system of claim 24, wherein the at least one telecommunication resource comprises authentication information, which is varied in a manner that is unpredictable by outsiders.

26. The data processing system of claim 25, wherein the varied authentication information comprises at least one address of the user's mobile device in a mobile communication network.

27. The data processing system of claim 25, wherein the varied authentication information comprises at least one link to a further network address.

28. The data processing system of claim 25, wherein the varied authentication information comprises at least one communication channel.

29. The data processing system of claim 1, wherein, the at least two categories of collected authentication information comprises at least the second category.

30. A method comprising:
storing program code instructions and data in a memory;
executing at least a portion of the program code instructions and processing at least a portion of the data by a processing system that includes at least one processing unit;
wherein said executing instructs the processing system to:
perform at least one teaching phase with respect to at least one user, wherein, in the at least one teaching phase, authentication information is collected for the user in at least two of the following at least three categories:
a first category on measurable physical characteristics of the user including at least image data for an image of the user performing at least one physical gesture;
a second category on communication resources provided by a mobile device associated with the user; and
a third category on knowledge possessed by the user,
perform at least one authentication phase with respect to the at least one user,
wherein, the at least two categories of collected authentication information comprises at least the first category,
wherein, in the at least one authentication phase, at least a portion of the collected authentication information is used to formulate at least one challenge for presentation to the user,
wherein at least one response to the formulated challenge is received from the user and correctness of the received response is determined based at least partially on comparison with at least a portion of the collected authentication information,
wherein at least one correctness metric is calculated for the at least one response received from the user, and
wherein the user is authenticated if the at least one calculated correctness metric meets or exceeds a first threshold value.

31. The method of claim 30, wherein, the at least two categories of collected authentication information comprises at least the second category.

32. A non-transitory memory device comprising program code instructions and data, wherein executing at least a portion of the program code instructions and processing at least a portion of the data by a processing system that includes at least one processing unit instructs the processing system to:

perform at least one teaching phase with respect to at least one user, wherein, in the at least one teaching phase, authentication information is collected for the user in at least two of the following at least three categories:
- a first category on measurable physical characteristics of the user including at least image data for an image of the user performing at least one physical gesture;
- a second category on communication resources provided by a mobile device associated with the user; and
- a third category on knowledge possessed by the user, and perform at least one authentication phase with respect to the at least one user, wherein, the at least two categories of collected authentication information comprises at least the first category, wherein, in the at least one authentication phase, at least a portion of the collected authentication information is used to formulate at least one challenge for presentation to the user, wherein at least one response to the formulated challenge is received from the user and correctness of the received response is determined based at least partially on comparison with at least a portion of the collected authentication information, wherein at least one correctness metric is calculated for the at least one response received from the user, and wherein the user is authenticated if the at least one calculated correctness metric meets or exceeds a first threshold value.

33. The non-transitory memory device of claim 32, wherein, the at least two categories of collected authentication information comprises at least the second category.

34. A data processing system comprising:
- a memory that stores program code instructions and data;
- a processing system including at least one processing unit, wherein the processing system executes at least a portion of the program code instructions and processes the data;

wherein the memory includes at least one authentication element that is implemented in part on a server accessible to multiple users and at least one mobile device associated with a user, the user being an authentication subject whose identity is to be authenticated by the data processing system, wherein the at least one authentication element executable by the processing system instructs the processing system to:

perform at least one teaching phase with respect to at least one user, wherein, in the at least one teaching phase, authentication information is collected for the user in at least two of the following at least three categories:
- a first category on measurable physical characteristics of the user including at least image data for an image of the user performing at least one physical gesture;
- a second category on communication resources provided by a mobile device associated with the user; and
- a third category on knowledge possessed by the user;

wherein, the at least two categories of collected authentication information comprises the first category;

perform at least one authentication phase with respect to the at least one user, wherein, in the at least one authentication phase, at least a portion of the collected authentication information is used to formulate at least one challenge for presentation to the user, wherein at least one response to the formulated challenge is received from the user and correctness of the received response is determined based at least partially on comparison with at least a portion of the collected authentication information, wherein at least one correctness metric is calculated for the at least one response received from the user; and wherein the user is authenticated if the at least one calculated correctness metric meets or exceeds a first threshold value.

35. The data processing system of claim 34, wherein, the at least two categories of collected authentication information comprises at least the second category.

* * * * *